(12) United States Patent
Ehrnsperger et al.

(10) Patent No.: US 8,498,851 B2
(45) Date of Patent: Jul. 30, 2013

(54) METHOD FOR EVALUATION OF ABSORPTION BEHAVIOR OF ABSORBENT ARTICLES

(75) Inventors: Bruno Johannes Ehrnsperger, Hessen (DE); Mattias Schmidt, Hessen (DE); Holger Beruda, Schwalbach (DE); Rodrigo Rosati, Hessen (DE); Raffaele Virgilio, Brussels (BE); Hans-Joerg Diersch, Berlin-Bohnsdorf (DE); Volker Clausnitzer, Berlin-Bohnsdorf (DE); Volodymyr Myrnyy, Berlin-Bohnsdorf (DE)

(73) Assignee: The Procter & Gamble Company, Cincinnati, OH (US)

( * ) Notice: Subject to any disclaimer, the term of this patent is extended or adjusted under 35 U.S.C. 154(b) by 571 days.

(21) Appl. No.: 12/660,446

(22) Filed: Feb. 26, 2010

(65) Prior Publication Data

US 2011/0138894 A1    Jun. 16, 2011

(30) Foreign Application Priority Data

Feb. 27, 2009    (EP) ..................................... 09153881

(51) Int. Cl.
 *G06G 7/50*    (2006.01)
 *G01F 1/00*    (2006.01)
 *G01N 15/08*    (2006.01)

(52) U.S. Cl.
 USPC .................................... 703/9; 702/12; 702/45

(58) Field of Classification Search
 USPC .......................... 703/9, 10; 702/12, 45, 50, 55
 See application file for complete search history.

(56) References Cited

U.S. PATENT DOCUMENTS

| 2005/0256686 | A1 | 11/2005 | Stabelfeldt et al. | |
| 2007/0231901 | A1* | 10/2007 | Takayama et al. | 435/404 |
| 2008/0046202 | A1 | 2/2008 | Allende-Blanco et al. | |

OTHER PUBLICATIONS

Shavit et al. (Wetting mechanisms of gel-based controlled-release fertilizers, Jul. 2002).*

* cited by examiner

*Primary Examiner* — David Silver
*Assistant Examiner* — Andre Pierre Louis

(57) ABSTRACT

An improved method and computer system is provided, for analyzing the two- or three-dimensional movement of a fluid in an absorbent article that comprises fluid-swellable composite material, which comprises a fluid-swellable solid material, and that comprises void spaces in the fluid-swellable composite material, the fluid-swellable composite material being defined by a virtual two-dimensional or three-dimensional mesh, to determine the performance or property of at least one feature of the fluid-swellable composite material thereof, or the absorbent article, the method comprising: inputting one or more properties for the fluid-swellable (composite) material into a model and evaluating this to determine the performance of a feature of the absorbent article or fluid-swellable composite material thereof, the virtual model.

18 Claims, 7 Drawing Sheets
(2 of 7 Drawing Sheet(s) Filed in Color)

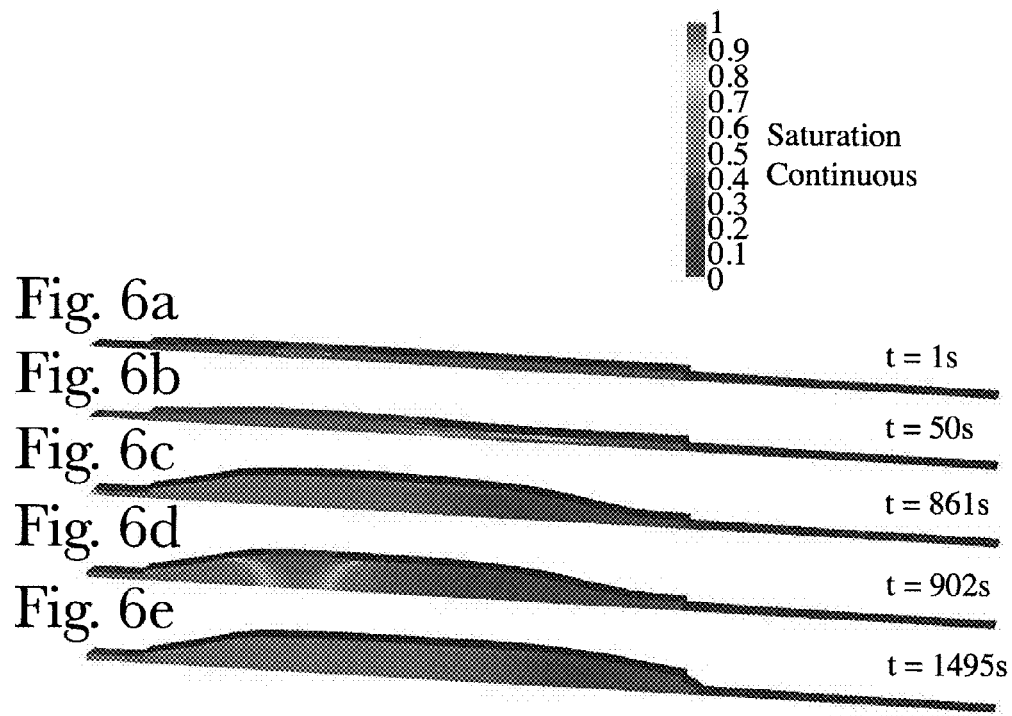
Fig. 6a
Fig. 6b  t = 1s
Fig. 6c  t = 50s
Fig. 6d  t = 861s
Fig. 6e  t = 902s
t = 1495s
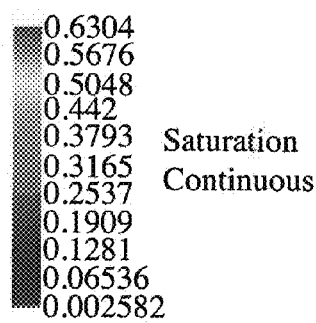
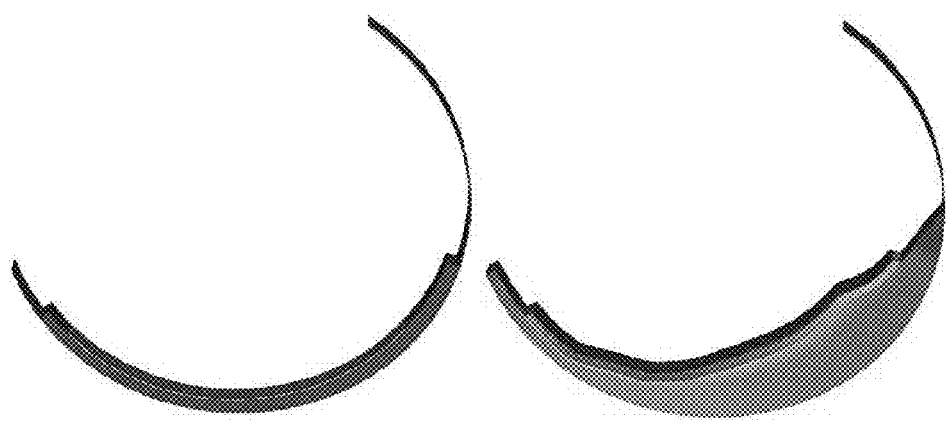
Fig. 7a    Fig. 7b

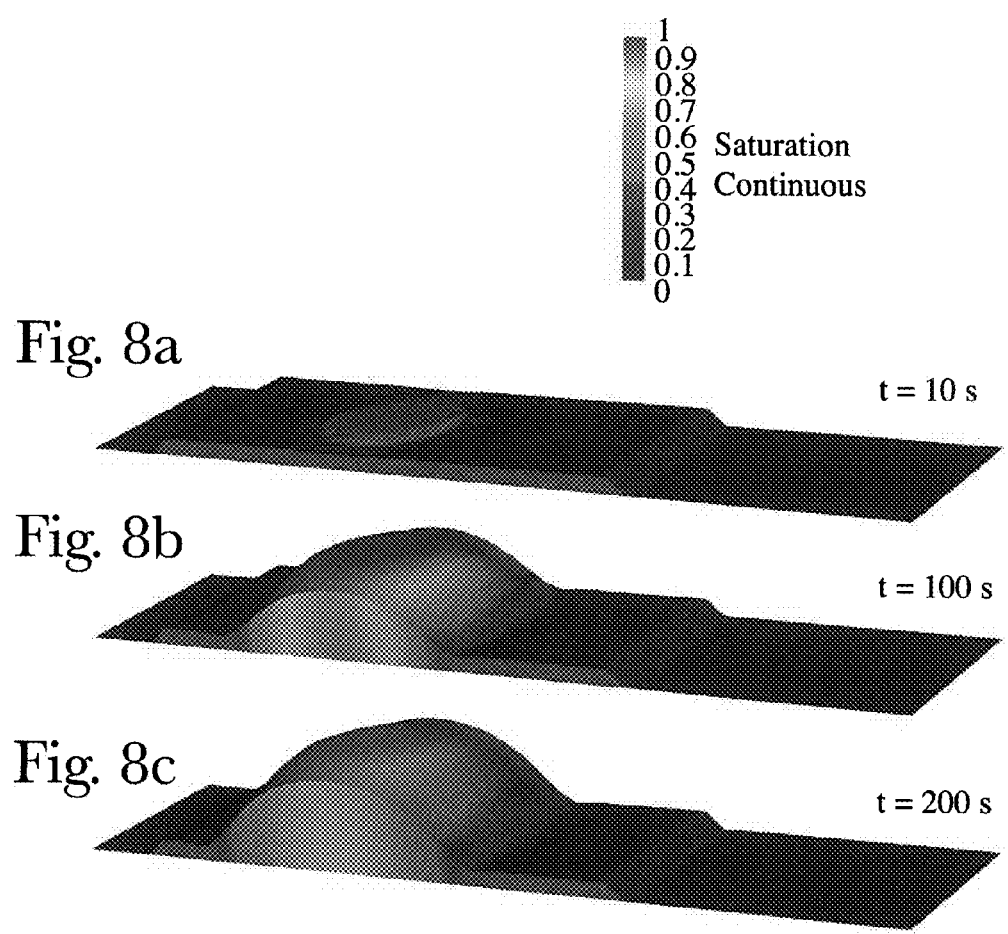

▨ boundary-segment shadow ⟶ boundary-segment normal vector
▨ fixed external constraint - - -▶ boundary-node normal vector ▨ fixed external constraint

METHOD FOR EVALUATION OF ABSORPTION BEHAVIOR OF ABSORBENT ARTICLES

CROSS REFERENCE TO RELATED APPLICATION

This application claims the benefit of EP Application No. 09153881.9 filed Feb. 27, 2009, the substance of which is incorporated herein by reference.

FIELD OF THE INVENTION

The present invention relates to a method for designing an absorbent article, and in particular its absorption behavior and swelling behavior.

BACKGROUND OF THE INVENTION

Manufactures and developers of absorbent articles have traditionally relied upon results from physical testing of prototypes as a basis for evaluating the performance of absorbent articles and as a basis for making design changes. Developing prototypes of absorbent articles can be expensive because the equipment necessary to manufacture the absorbent article may not be developed at the time when new absorbent articles are being developed. In some instances, the materials from which the absorbent article will be constructed have yet to be developed. Furthermore, physical testing often requires working in a controlled laboratory environment, which can be expensive. In the case of hygienic products, such as catamenial devices, wound dressings, facial tissue, diapers, and diaper wipes, laboratory personnel may be exposed to increased risks to their health as a result of handling animal exudates during laboratory tests. For absorbent articles designed to absorb other materials, physical testing may require that laboratory personnel be exposed to unhealthy chemicals that the absorbent article is designed to absorb.

Obtaining data describing the transient behavior of absorbent articles can be challenging. Often, a designer of absorbent articles is interested in how the absorbent article acquires fluid at the onset of exposure to a fluid. By the time the designer removes the absorbent article from exposure to the fluid, dissects the absorbent article, emplaces portions of the absorbent article and measures the distribution of the fluid therein, the distribution of the fluid can change significantly as compared to the distribution of fluid when the absorbent article was removed from contact with the fluid.

In some design processes for designing absorbent articles, physical testing on replicates of absorbent articles is needed to deduce conclusions based on observed results from testing. Testing replicates can help reduce uncertainties in making evaluations of different designs for absorbent articles and making decisions on how to improve designing of an article. Creating prototypes that are precise replicates of one another can be challenging, but when prototypes are not precise replicates of one another, interpreting testing results can be more difficult.

Absorbent articles are often designed to absorb a variety of substances. The substance may be a fluid containing only a single constituent, such as water. The substance may be a multi-phase fluid such as human menstrual fluid, animal menses or bowel movement material. Physical testing of prototypes of absorbent articles exposed to substances comprising multiple components in multiple phases can be problematic, because the designer of the absorbent article may be unable to identify the particular impacts of specific phenomena on the performance of the absorbent article. Furthermore, the testing equipment used to test absorbent articles is often designed to test the absorbency with respect to clean water, rather than a substance containing a variety of solid, organic or inorganic fluid, and gaseous phases.

The fluid transport properties of absorbent materials commonly used in absorbent articles can be difficult to measure. Key fluid transport properties, which partially describe interactions between the absorbent and fluid, include the capillary pressure as a function of saturation and the relative permeability as function of saturation. However, some of these properties are not constant over time or throughout a product. Most commonly used methods for measuring the absorbent-fluid interaction properties are not suitable for testing with fluids other than water.

Thus, there is a continuing unaddressed need for methods for developing absorbent articles that integrates physical measurements of the absorbent properties of absorbent materials into the design process.

Additionally, there is a continuing unaddressed need for virtual product development methods that allow for the product developer to gather data on the transient performance of an absorbent article. Further, there is a continuing unaddressed need for methods for developing absorbent articles that do not rely entirely on physical testing of prototypes. There is also a continuing unaddressed need to be able to test absorbent materials and designs for absorbent articles without having to expose personnel to the substances absorbent articles are designed to absorb.

Furthermore, there is a continuing unaddressed need for methods for measuring the capillary pressure versus saturation function for fluids other than water.

Copending U.S. application Ser. No. 11/504,993 describes a model and method to design articles with a certain fluid acquisition, solving the equation of continuity and partially saturated flow in porous media (also known as the Richard's equation).

Furthermore, for absorbent articles that comprise fluid-swellable material, also called superabsorbent material or hydrogel-forming, that absorb liquid due to an osmotic pressure gradients between the material and the surrounding fluid, and that subsequently swell upon absorption, the traditional Richard's equation is no longer sufficient to describe correctly the fluid flow through the swelling structure formed by the particles. In fact, the swelling process is an important factor because it can cause the structure to increase its thickness significantly, even (e.g.) 10 to up to 100 times. Such swelling leads to changes of intrinsic properties, namely permeability, capillary pressure and porosity. Such changes are controlled by the swelling kinetics of the water-swellable material in the product structure. It is thus important that said equations used and models used include the two- or three-dimensional swelling behavior of the fluid-swellable composite material, or solid component thereof.

Thus, there is a need for a design method to design absorbent articles comprising fluid-swellable composite material as mentioned above, and in particular a design method for designing absorbent articles with multiple layers of such composite material and design methods that accurately take into account the two- or three-dimensional swelling behavior thereof and the influence thereof on other article properties and fluid flow, at (a) certain location(s) within the article and/or at a certain time. Thereto, the inventors have found improved methods and computer systems as described herein, for determining certain properties of certain features of absorbent articles by not only determining the liquid present in the fluid-absorbent material, in the solid parts and voids thereof, but that also take into account the displacement of the absorbent article locations, defined by a mesh overlapped to the absorbent article, and redefining the locations and mesh continuously over time, to obtain improved predictions of said properties.

SUMMARY OF THE INVENTION

The present invention provides, for example in a computer system having a central processing unit, a graphical user interface including a display communicatively coupled to said central processing unit, and a user interface selection device communicatively coupled to the central processing unit, an improved method for analyzing the two- or three-dimensional movement of a fluid in an absorbent article that comprises fluid-swellable composite material, which comprises a fluid-swellable solid material, and that comprises void spaces in said fluid-swellable composite material, said fluid-swellable composite material being defined by a virtual two-dimensional or three-dimensional mesh, to determine the performance or property of at least one feature of said fluid-swellable composite material thereof, or said absorbent article, said method comprising:
- a) inputting one or more properties for said fluid-swellable composite material, or fluid-swellable solid material thereof, into a virtual model of the absorbent article; and
- b) evaluating the virtual model of the absorbent article to determine the performance of said at least one feature of the absorbent article or fluid-swellable composite material thereof, said virtual model comprising a solution of the following equations:
- i) an equation for determining the liquid movement in said void spaces, at a given location of said fluid-swellable composite material and/ or at a given time;
- ii) an equation for determining the amount of liquid present in said fluid-swellable solid material, at a given location of said fluid-swellable composite material and/ or at a given time; and
- iii) an equation for determining the displacement of one or more locations or said mesh of the fluid-swellable composite material, due to swelling of said material, at a given time, including an equation for determining displacement of said mesh over time and an equation for determining a refinement of said mesh over time.

In another embodiment, the invention relates to an improved method, for example in a computer system having a central processing unit, a graphical user interface including a display communicatively coupled to said central processing unit, and a user interface selection device communicatively coupled to the central processing unit, for analyzing the two- or three-dimensional movement of a fluid in an absorbent article that comprises fluid-swellable composite material, which comprises a fluid-swellable solid material, and that comprises void spaces in said fluid-swellable composite material, said fluid-swellable composite material being defined by a virtual two-dimensional or three-dimensional mesh, to determine the performance of at least one feature of the absorbent article or said fluid-swellable composite material thereof, said method comprising:
- a) inputting one or more properties for said fluid-swellable composite material, or fluid-swellable solid material thereof, into a virtual model of the absorbent article; and
- b) evaluating the virtual model of the absorbent article to determine the performance of said at least one feature of the absorbent article or said fluid-swellable composite material thereof, said virtual model comprising solutions of the following equations:

$$\varepsilon \frac{\partial_s^l(\Psi^l)}{\partial t} + \varepsilon s^l \overline{\gamma} \frac{\partial \Psi^l}{\partial t} - \nabla \cdot [k_r^l K(\nabla \Psi^l + e)] = \qquad (E1)$$

$$-\left[\frac{1}{\rho_o^l}\frac{\overline{C}_{AGMo}^s}{J^s} + \varepsilon \frac{\partial_s^l}{\partial m_2^s} + s^l\left(\frac{\partial \varepsilon}{\partial m_2^s} + \frac{\varepsilon}{J^s}\frac{\partial J^s}{\partial m_2^s}\right)\right]\frac{\partial m_2^s}{\partial t} -$$

$$\frac{1}{\rho_o^l}\phi^s(u^s) - \phi^l(u^s)$$

$$\frac{\partial \overline{C}_{L \to So}^s}{\partial t} = \tau a^{sl}(\hat{s}(s_o^l))\hat{m}_2^s \overline{C}_{AMGo}^s - J^s \phi^s(u^s)$$

$$\nabla \cdot u^s = d^s$$

The invention also relates to a computer system, as described above, using a method as set out above. The invention also relates to a system whereby a computer (e.g. as above) uses a method, as set out above.

Said method, computer or computer system may comprise herein:
- a) a computer readable memory device containing data and instructions for analyzing movement of fluid in an absorbent article;
- b) a means for analyzing movement of fluid in an absorbent article;
- c) a means for reporting saturation of the absorbent article as a function of time and position (or location); and
- d) a means for determining at a certain time, displacement of (a) location(s) of said fluid-swellable composite material, or typically of a virtual mesh of said composite material, due to swelling thereof (due to liquid absorption), to obtain a location(s) displacement or mesh displacement (at said time); and then optionally refining the displaced mesh to obtain a refined mesh; and reiterating this one or more times; and
- e) a means for correlating the amount of liquid in said solid fluid-swellable material and in said pores as a function of time and displacement position (as obtained above under a) to d) combined above) to the performance of the at least one feature of the absorbent article (or property).

Typically, the properties of said fluid-swellable composite material, or solid material thereof, inputted into the model are selected from the permeability (k), capillary pressure ($p_c$), porosity ($\epsilon$), fluid-swellable solid material (e.g. AGM) speed rate constant ($\tau$), maximum fluid-swellable solid material (e.g. AGM) x-load $m_{max}^s$ and/ or concentration (of the fluid-swellable solid material).

The model may determine for example the amount of liquid absorbed by said fluid-swellable composite material (thus present in said solid, e.g. particulate, parts of the fluid-swellable composite material) and the amount of liquid present in said void space(s), present between said solid parts (e.g. particles) of the fluid-swellable composite material, and the displacement of said material due to swelling, at a certain time and/ or location in the article, typically by defining said material, or said article, by a mesh, and determining the displacement of the mesh due to swelling, and redefining (herein referred to as refinement) of the mesh after displacement. This is typically done at multiple time intervals, to obtain a moving mesh and moving mesh image, which can give a virtual picture of said material or article over time Unlike prior suggested methods, the present method and system provides a way to include swelling of the article or composite material thereof over time, by including locations displacement and continuously updated locations displacement (e.g. mesh deformation and movement, as described herein after) in the equations.

The model may also determine the dimensions at a given location, e.g. including thickness, of the absorbent article, or structure or fluid-swellable composite material thereof, at a function of time or at a given time.

In one embodiment, the fluid-swellable composite or absorbent article comprises in addition a non-swellable material and said step a) includes in addition inputting a property of said non-swellable material.

FIGURES

The file of this patent contains at least one drawing executed in color. Copies of this patent with color drawing(s) will be provided by the Patent and Trademark Office upon request and payment of the necessary fee.

FIG. 6 shows a two-dimensional virtual representation of the swelling behavior and the level of fluid saturation of a flat absorbent article, over time.

FIG. 7 shows a two-dimensional virtual representation of the swelling behavior and level of fluid saturation of a curved absorbent article, over a first and second time.

FIG. 8 shows a three-dimensional virtual representation of the swelling behavior and level of fluid saturation of a flat absorbent article, over time.

DETAILED DESCRIPTION

Figure 1:
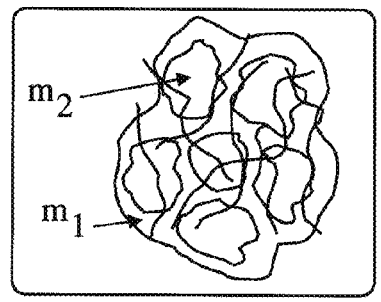
FIG. 1 shows an enlarged view of cross-sections of a fluid-swellable composite material with a number of water-swellable material particles with fluid in the pores between the particles and fluid in the particles.

The present invention provides as solution to evaluate the swelling of fluid-swellable composite materials and/ or absorbent articles comprising said composite material and coupling it with the Richard's equation. Specifically, the flow and deformation processes in swelling porous media are modelled for absorbent hygiene products (e.g., diapers, wipes, papers), in order to determine certain performances or properties thereof. The hysteretic unsaturated flow, liquid absorption and deformation of fibrous porous structures are described through a resulting set of equations, including a generalized Richard's equation, an equation for the solid-mass conservation with kinetic reaction term, and a relationship for the solid strain. The system of equations must be closed by multiple constitutive relations that include rather complex expressions and make the system highly nonlinear. The swelling porous structures are modelled as a large-scale deformation problem with accumulating discrete spatial movements over finite time intervals.

Importantly, it requires a moving-mesh technique which incrementally updates two- or three-dimensional model domains based directly on the current spatial distribution of the solid displacement within a Newton-type or Picard-type iteration scheme, as described in more detail below, whereby spatial, temporal and residual errors are mutually controlled. Spline approximations can be used for better and more flexible descriptions of experimental data and measured relations. These equations and the relevant finite element solution strategy are used for practical applications to simulate flow in absorbent articles and design those absorbent articles.

"Fluid-swellable" means herein that the fluid-swellable composite material or fluid-swellable solid material (e.g. particles, fibres) herein changes volume due to contact with a fluid. The fluid-swellable composite material herein is also referred to herein as AGM, for simplicity reasons. It should be understood that this material may be any fluid-swellable material, and is or comprises so-called absorbent gelling material, or AGM.

Said fluid-swellable material useable herein typically absorbs fluid, and then swells, due to an osmotic pressure gradient between fluid in said material and fluid outside said material.

Said fluid-swellable composite material useable herein typically absorbs fluid, and then increases in its content and volume and thus swells.

Alternatively, said fluid-swellable composite material useable herein absorbs fluid, and then swells, due to the fact that the fluid changes mechanical properties of the material. However, a decrease of volume is also envisaged herein. (E.g. the model encompasses situations like fluff pulp fibers softening, fluff pulp fiber wet collapse, or decrease of volume of the fluid-swellable material due to external pressure and softening of the material.

Any fluid (also referred herein as "liquid") may be used herein, but typically fluids (or liquids) used herein include water, artificial menstrual fluid, blood, menstrual blood, human and animal menstrual fluid, synthetic vaginal discharge, human and menstrual vaginal discharge, synthetic urine, urine, fluid from a bowel movement, bowel movement analogue, sweat, synthetic sweat, skin care product, a lubricant, a surfactant, a cleanser, a detergent, a beverage, a petroleum product, and vomit, and mixtures thereof.

The absorbent article herein may comprise fluid-swellable composite material and void space in said fluid-swellable composite material, e.g. between the fluid-swellable solid material, e.g. such as the fluid-swellable superabsorbent material particles or fluid-swellable absorbent gelling materials, or AGM, and optionally fluid-swellable fibres.

The absorbent article may be any article, but in one embodiment, the absorbent article is diaper, such as baby diapers, pull-on diapers, training pants, adult incontinence products (pads or diapers); or a feminine hygiene products, such as sanitary napkins or panty-liners or tampons; or tissue paper products, such as breast pads, handkerchiefs; or wipes.

The article may comprise said fluid-swellable composite material in a single absorbent region, layer (e.g. core), or in multiple regions or layers, for example distinct layers as described herein below. It may comprise in additions one or more regions or layers that temporarily absorb or distribute fluid, but do not swell (e.g. less than 20% volume increase, or less than 10% or less than 5%).

The fluid-swellable composite material herein comprises at least one fluid-swellable material in solid form, e.g. particles. In one embodiment, the composite material comprises at least two such fluid-swellable materials, for example fluid-swellable particles and fluid-swellable fibres. In one embodiment the fluid-swellable composite material additionally comprises non-fluid-swellable (solid) material, including thermoplastic and/or non-swellable fibrous material, and including adhesive.

In one embodiment the absorbent structure or article comprises said fluid-swellable composite material, which comprises at least fluid-swellable superabsorbent particles (herein also referred to as absorbent gelling particles or AGM) and/or at least fluid-swellable fibres and optionally also binders, adhesives, non-swellable fibres, fillers.

In one embodiment, the absorbent structure comprises at least two such fluid-swellable composite materials (which may be the same) that are separated at least partially from one another by a non-swellable material that is however water-permeable. For example, this may be an absorbent structure with two or more layers, each comprising a fluid-swellable composite material, (partially) separated from one another by for example a nonwoven layer, or an adhesive layer. In another embodiment, the absorbent structure comprises one or more non-swellable materials, for instance a topsheet and/or an acquisition layer and/or a distribution layer, and 1 or more fluid-swellable composite material(s). The fluid-swellable composite material(s) can be placed on the top, in the middle or on the bottom of the absorbent structure or anywhere else in the absorbent structure, depending on specific applications.

The virtual model, method and system herein may be a one dimensional or a two or three dimensional model. In one embodiment, it is a three dimensional method and system.

The method, system and model herein use certain assumptions/approximations: including:
1. The fluid-swellable composite material comprises fluid-swellable particulate material and may comprise voids between the particles of said material; liquid is either in said voids or inside the fluid-swellable particulate material.
2. Once fluid (liquid) is in the fluid-swellable material and caused it to swell, it remains inside said material.
3. The fluid (liquid) once in the fluid swellable material and caused it to swell, does not redistribute inside the fluid-swellable material.
4. Fluid can distribute inside the voids; this distribution is governed by Darcy's law and liquid mass conservation.

FIG. 1 exemplifies how the liquid in the material can be regarded as liquid in voids $m_1$ and liquid in fluid-swellable material, e.g. fluid-swellable material particles, $m_2$, as mentioned above.

Solutions to the equations herein above and herein after will depend on initial conditions and boundary conditions. An initial condition could e.g. be that initially (at time $t=t\_0$) there is no fluid in the voids and no fluid in the fluid swellable material. I.e. $m_1(t=t\_0,(x,y,z))=0$ and $m_2(t=t\_0,(x,y,z))=0$.

Boundary condition could e.g. be that fluid can neither enter nor leave the composite material at some boundary areas of the fluid swellable, while at other boundary areas fluid is pressed into the fluid swellable composite material with a given pressure.

Another boundary condition could be to keep the saturation (or the capillary pressure) at some area of the boundary constant. All the boundary conditions may be time dependent (i.e. change over time), and/or dependent on (time and /or space integrals over) $m_1$ and $m_2$.

In one embodiment, the method, system or computer includes solutions of each and all of the following equations:

$$\varepsilon \frac{\partial_s^l(\Psi^l)}{\partial t} + \varepsilon s^l \overline{\gamma} \frac{\partial \Psi^l}{\partial t} - \nabla \cdot [k_r^l K(\nabla \Psi^l + e)] = \quad \text{E1}$$

$$-\left[\frac{1}{\rho_o^l} \frac{\overline{C}_{AGMo}^s}{J^s} + \varepsilon \frac{\partial_s^l}{\partial m_2^s} + s^l \left(\frac{\partial \varepsilon}{\partial m_2^s} + \frac{\varepsilon}{J^s} \frac{\partial J^s}{\partial m_2^s}\right)\right] \frac{\partial m_2^s}{\partial t} -$$

$$\frac{1}{\rho_o^l} \phi^s(u^s) - \phi^l(u^s)$$

$$\frac{\partial \overline{C}_{L \to So}^s}{\partial t} = \tau a^{sl}(\hat{s}(s_e^l)) \hat{m}_2^s \overline{C}_{AGMo}^s - J^s \phi^s(u^s)$$

$$\nabla \cdot u^s = d^s$$

Where the Primary variables are $\psi^l \overline{C}_{L \to So}^s$ and $u^s$.

All letters and abbreviations used in the equations herein are described in the nomenclature list below in the description.

In addition to the equations above, the following constitutive relations may apply and may be included in the method or system of the invention:

E2

$$s_e^l = \frac{s^l - s_r^l}{s_s^l - s_r^l} = \begin{cases} \frac{1}{[1 + |\alpha(m_2^s)\psi^l|^n]^m} & \psi^l < 0 \\ 1 & \psi^l \geq 0 \end{cases} \quad (118)$$

$$\alpha(m_2^s) = \frac{\alpha_{max}}{(1 + m_2^s \alpha_{scale})^{\alpha_{exp}}}, \quad \alpha_{max} = \begin{cases} \alpha_{max,wetting} & \frac{\partial \psi^l}{\partial t} > 0 \\ \alpha_{max,drying} & \frac{\partial \psi^l}{\partial t} < 0 \end{cases}$$

$$k_r^l = (s_e^l)^\delta$$

$$K = \frac{k \rho_o^l g}{\mu^l} = K_{base} I[1 + k_{coeff} \exp(k_{expcoeff} \hat{m}_2^s)$$

$$\sin(2\pi k_{sinecoeff} \hat{m}_2^s + k_{sinephase})]$$

$$K_{base} = \frac{k_{base} \rho_o^l g}{\mu^l} \quad \hat{m}_2^s = \frac{m_{2\,max}^s - m_2^s}{m_{2\,max}^s}$$

$$a^{sl}(\hat{s}(s_e^l)) = \frac{1 - e^{-\alpha \exp l}}{1 - e^{-\alpha \exp}} \quad \hat{s}(s_e^l) = \frac{s_e^l - s_{e.\,threshold}^l}{1 - s_{e.\,threshold}^l}$$

$$\varepsilon = \frac{2\varepsilon_{max}}{1 + (m_2^s \varepsilon_{scale} + 1)^{\varepsilon_{exp}}} \quad \frac{\partial \varepsilon^s}{\partial m_2^s} =$$

$$\frac{2\varepsilon_{max} \varepsilon_{scale} \varepsilon_{exp} (m_2^s \varepsilon_{scale} + 1)^{\varepsilon_{exp}-1}}{[1 + (m_2^s \varepsilon_{scale} + 1)^{\varepsilon_{exp}}]^2}$$

$$\varepsilon_o^s = \frac{\overline{C}_{AFo}^s}{\rho_{AFo}^s} + \frac{\overline{C}_{AGMo}^s}{\rho_{AGMo}^s} \quad \varepsilon_{max} = 1 - \varepsilon_o^s$$

$$\frac{\partial s^l}{\partial m_2^s} = -\frac{(s_s^l - s_r^l)\Psi^l mn[\alpha(m_2^s)\Psi^l]^{n-1}}{\{1 + [\alpha(m_2^s)\Psi^l]^n\}^{m+1}}$$

$$\frac{\alpha_{max} \alpha_{scale} \alpha_{exp}}{[1 + \alpha_{scale}(m_2^s - m_{2.\,threshold}^s)]^{\alpha_{exp}+1}}$$

$$J^s = \frac{1}{1-\varepsilon}\left(\varepsilon_o^s + m_2^s \frac{\overline{C}_{AGMo}^s}{\rho_{H_2O}^s}\right) \quad \frac{\partial J^s}{\partial m_2^s} = \frac{1}{1-\varepsilon}\left(\frac{\overline{C}_{AGMo}^s}{\rho_{H_2O}^s} - J^s \frac{\partial \varepsilon^s}{\partial m_2^s}\right)$$

$$d^s = \frac{J_{n+1}^s}{J_n^s} - 1$$

$$\phi^l(u^s) = \frac{\partial u^s}{\partial t} \cdot \nabla(\varepsilon s^l)$$

$$\phi^s(u^s) = \frac{\partial u^s}{\partial t} \cdot \nabla(\varepsilon^s \rho^s)$$

$$m_2^s = \frac{\overline{C}_{L \to So}^s}{\overline{C}_{AGMo}^s}$$

Hereby, the saturation of the liquid phase $s^l$ is a secondary variable derivable from a VG capillary-pressure relationship at a known pressure head $\psi^l$.

$$s_e^l = \frac{s^l - s_r^l}{s_s^l - s_r^l} = \begin{cases} \frac{1}{[1+|\alpha\psi^l|^n]^m} & \psi^l < 0 \\ 1 & \psi^l \geq 0 \end{cases} \quad (E3)$$

Nomenclature for the Equations E1 to E13:

The following letters and symbols are used herein in the equations E1 to E13 and mean the following:

AGM—refers to the fluid-swellable solid material, e.g. including absorbent gelling material, as described herein above.

AF—refers to airfelt material or any other non fluid-swellable component of the fluid-swellable solid material, e.g. glues, polymers, etc.

| | | |
|---|---|---|
| $A_p$ | $L^2$ | solid-liquid interface area per REV; |
| $A_{p,total}$ | $L^2$ | maximum solid-liquid interface area per REV; |
| $a^{sl}(s^l)$ | 1 | saturation-dependent fraction of the solid-liquid interface area; |
| a | 1 | solid displacement direction vector; |
| $a_i$ | 1 | direction vector at node i; |
| $a_i$ | 1 | spatial components of a; |
| B | L | thickness; |
| C | $ML^{-1}T^{-2}$ | stiffness tensor, |
| c | $ML^{-3}$ | intrinsic concentration; |
| $\bar{c}$ | $ML^{-3}$ | bulk concentration; |
| $C_a$ | $L^{-1}$ | pore constant; |
| D/Dt | $T^{-1}$ | material derivative; |
| d | 1 | strain vector: |
| $d^s$ | 1 | volumetric solid strain; |
| e | 1 | $= -g/|g|$, gravitational unit vector; |
| f | | external supply or function; |
| G | 1 | geometry constant; |
| g | $LT^{-2}$ | gravity vector; |
| g | $LT^{-2}$ | $= |g|$, gravitational acceleration; |
| H | $L^2$ | surface tension head; |
| $h^l$ | L | $= x_3 + \psi^l$, hydraulic head of liquid phase l; |
| I | 1 | unit vector; |
| $J^s$ | 1 | Jacobian of solid domain, volume dilatation function; |
| j | $ML^{-2}T^{-1}$ | diffusive (nonadvective) flux vector; |
| K | $LT^{-1}$ | hydraulic conductivity tensor; |
| k | $L^2$ | permeability tensor, |
| $k_r$ | 1 | relative permeability; |
| $k^+$ | $M^{-1}LT^{-1}$ | reaction rate constant; |
| L | $L^{-1}$ | gradient operator; |
| L | $ML^{-3}T^{-1}$ | differential operator, |
| $l_i^s$ | L | side lengths of a small solid cuboid; |
| M | M | molar mass; |
| m | 1 | unit tensor; |
| m | M | mass; |
| m | 1 | VG curve fitting parameter; |
| $m_2^s$ | 1 | AGM x-load; |
| $\hat{m}_2^s$ | 1 | $= (m_{2max}^s - m_2^s)/m_{2max}^s$, normalized AGM x-load; |
| $m_{max}^s$ | 1 | maximum AGM x-load; |
| n | 1 | pore size distribution index; |
| p | $ML^{-1}T^{-2}$ | pressure; |
| Q | $ML^{-3}T^{-1}$ | mass supply; |
| q | $LT^{-1}$ | volumetric Darcy flux; |
| R | $ML^{-3}T^{-1}$ | chemical reaction term; |
| R | L | radius; |
| r | L | pore radius or distance; |
| s | 1 | saturation; |
| u | L | solid displacement vector, placement transformation function; |
| u | L | scalar solid displacement norm; |
| V | $L^3$ | REV volume; |
| $V_p$ | $L^3$ | pore volume; |
| v | $LT^{-1}$ | velocity vector; |
| x | L | Eulerian spatial coordinates; |
| $x_i$ | L | components of x; |
| $\alpha$ | $L^{-1}$ | VG curve fitting parameter; |
| $\Gamma^s$ | $L^2$ | closed boundary of solid control space $\Omega^s$; |
| $\gamma$ | $M^1LT^2$ | liquid compressibility; |
| $\bar{\gamma}$ | $L^{-1}$ | $= \gamma \rho_0^l g$, specific liquid compressibility; |
| $\gamma_{ij}$ | 1 | shear strain component; |
| $\delta$ | 1 | exponential fitting parameter; |
| $\delta_{ij}$ | 1 | $= \begin{cases} 1 & i=j \\ 0 & i \neq j \end{cases}$ Kronecker delta; |
| $\epsilon$ | 1 | porosity, void space; |
| $\epsilon^\alpha$ | 1 | volume fraction of $\alpha$-phase; |
| $\mu$ | $ML^{-1}T^{-1}$ | dynamic viscosity; |
| $\rho$ | $ML^{-3}$ | density or intrinsic concentration; |
| $\sigma$ | $ML^{-1}T^{-2}$ | solid stress tensor; |
| $\sigma^*$ | $ML^{-2}T^{-2}$ | liquid surface tension; |
| $\tau$ | $T^{-1}$ | AGM reaction (speed) rate constant; |
| $\phi^l, \phi^s$ | $T^{-1}, ML^{-1}T^{-1}$ | deformation (sink/source) terms for liquid and solid, respectively; |
| $\psi^l$ | L | pressure head of liquid phase l; |
| $\Omega^s$ | $L^3$ | control space of porous solid or domain; |
| $\omega_k$ | 1 | mass fraction of species k; |
| $\omega$ | 1 | reaction rate modifier; |
| $\nabla$ | $L^{-1}$ | Nabla (vector) operator (=grad); |
| $\nabla_i$ | | $= \partial/\partial x_i$, partial differentiation with respect to $x_i$; |
| $AGM_{raw}$ | | available AGM in reaction; |
| $AGM_{consumed}$ | | consumed AGM in reaction; |
| AGM | | AGM; |
| c | | capillary; |
| e | | effective or elemental; |
| $H_2O$ | | water; |
| I | | material Lagrangian coordinate, ranging from 1 to 3; |
| i, j | | spatial Eulerian coordinate, ranging from 1 to 3, or nodal in |
| k | | species indicator; |
| $L \rightarrow S$ | | AGM absorbed liquid; |
| o | | reference, initial or dry; |
| p | | pore; |
| r | | residual, reactive or relative; |
| $\alpha$ | | phase indicator; |
| D | | number of space dimension; |
| g | | gas phase; |
| l | | liquid phase; |
| s | | solid phase; |
| T | | transpose; |
| REV | | representative elementary volume; |
| RHS | | right-hand side; |
| SAP | | superabsorbent polymer; |
| VG | | van Genuchten; |
| [ ... ] | | chemical activity, molar bulk concentration; |
| ( )·( ) | | vector dot (scalar) product; |
| ( )⊗( ) | | tensor (dyadic) product; |

The deformation terms $\Phi^l(u^l)$ and $\Phi^s(u^s)$ herein are negligible if the product from the solid velocity $\delta u^s/\delta t$ and the gradient of the saturation $s^l$ as well as the gradient in the solid fluid-swellable material (i.e. referred to herein as AGM) x-load $m_2^s$ remains small relative to the other terms. This is accepted because the major displacement direction $u^s$ is taken herein to be perpendicular to the gradient of the fluid-swellable material x-load $\nabla m_2^s$ and the gradient of the saturation $\nabla s^l$.

The solid displacement $u^s$ may be computed from the hyperbolic differential equation $\nabla \cdot u^s = d^s$ where the scalar solid strain $d^s$ is a function of the volume dilatation $J^s$ and therefore a function of the AGM x-load $m_2^s$. The displacement vector $u^s$ can be decomposed into a scalar displacement norm $u^s$ and a displacement-direction vector $a^s$ of unit size, $$u^s = u^s a^s = u^s \begin{bmatrix} a_1^s \\ a_2^s \\ a_3^s \end{bmatrix} \quad (E4)$$

So that $$\nabla \cdot u^s = a^s \cdot \nabla u^s + u^s \nabla \cdot a^s \quad (E5)$$

The second term on the RHS will be zero for a homogeneous displacement direction, i.e., if all points of the domain move in the same direction. This term may be neglected if the restriction below is satisfied $$a^s \cdot \nabla u^s \gg u^s \nabla \cdot a^s \quad (E6)$$

Figure 9:
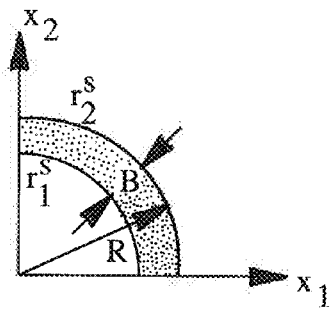
FIG. 9 shows a two-dimensional partial cross section of a spherical shell.

Namely, a geometric constraint on the curvature of the domain can be developed using an idealized domain of thickness B and spherical inner ($\Gamma_1^s$) and outer ($\Gamma_2^s$) surfaces, both centered at the origin, as shown in FIG. 9 (R denote the radius of the outer surface). The inner surface is the fixed domain boundary and the swelling-direction vector field $a^s(x)$ is given by $a_i^s = x_i/r$, where $$r = \sqrt{\sum_{i=1}^{D} x_i^2} \quad (E7)$$

is the distance of x from the origin. The number of spatial dimensions is denoted by D. It follows that $$\nabla \cdot a^s = \frac{D-1}{r} \quad (E8)$$

Hereby, $u^s = u_{min}^s = 0$ on $\Gamma_1^s$ and $u^s = u_{max}^s = \Gamma_2^s$ on, the following order-of-magnitude estimates can be established:

$$O(u^s) = u_{max}^s$$

$$O(\nabla u^s) = u_{max}^s / B$$

$$O(a^s) = 1 \quad (E9)$$

In two-dimensional space, $\Delta \cdot a^s = 1/R$ for any point on $\Gamma_2^s$, and, substituting the order-of-magnitude estimates into the restriction, $$u_{max}^s / B \gg u_{max}^s / R \quad (E10)$$

Hereby: $R \gg B$ (E11), because the error associated with ignoring the divergence of the displacement-direction vector field $a^s$ is negligible as long as the thickness of the domain remains much smaller than the radius of its curvature.

Figure 10:
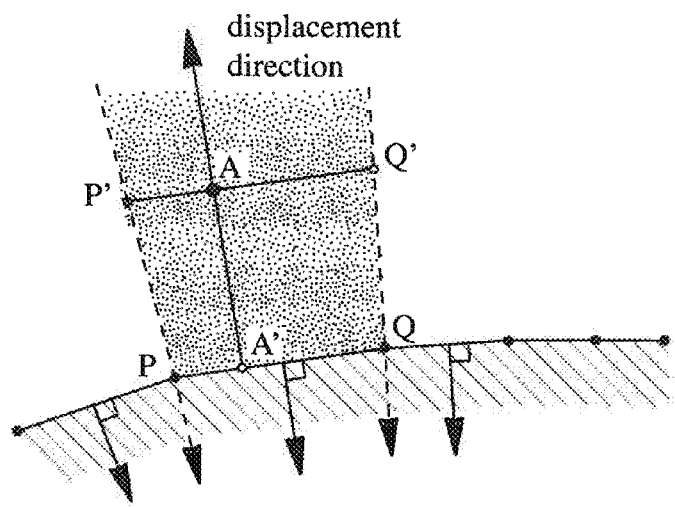
FIG. 10 shows the determination of a two dimensional mesh nodal displacement direction.

To simplify the numerical implementation, the displacement direction of each point within the domain remains stationary. FIG. 10 shows how the mesh displacement direction can be determined.

Any pair of adjacent nodes on the fixed boundary defines a boundary segment. Normal vectors can be defined for boundary nodes as the resultant of the normals of the two segments connected by that node, scaled to unit size (the two end nodes of a boundary sequence have only one adjacent segment each). Denoting the position of mesh node i by A, let P and Q be the positions of the two adjacent boundary nodes that delimit the boundary segment where A is located. A line through A that is parallel to line PQ intersects the boundary-normals of P and Q at P' and Q', respectively. Point A' between P and Q on the fixed boundary is then obtained such that $$\frac{|P'A|}{|P'Q'|} = \frac{|PA'|}{|PQ|} \quad (E12)$$

Line A'A defines the stationary displacement direction $a_i^s$ for node i. A crossing of nodal displacement paths, which would lead to ill-defined mesh geometry, is completely prevented if the fixed boundary has no concave parts. Concave boundary sections are acceptable if the final (maximum) displacement is less than the distance at which the first crossover between neighboring nodes would occur. This condition is expected to be met in many practical applications.

Figure 11:
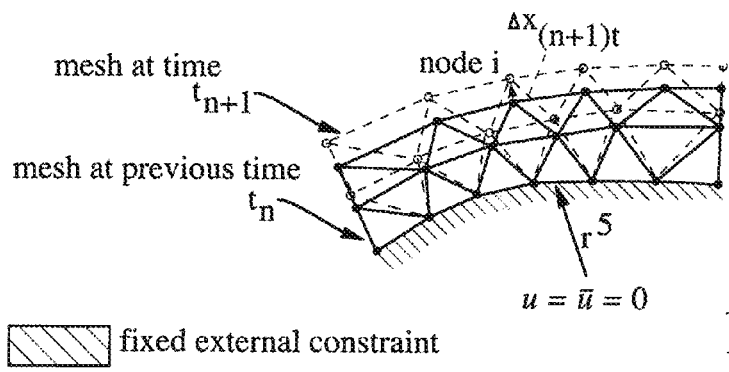
FIG. 11 shows a two-dimensional mesh displacement.

As shown in FIG. 10 the sequence of mesh nodes that define the fixed boundary of the model domain can defined. FIG. 11 shows how the mesh displacement and mesh refinement as used herein can be done for the purpose of the invention.

As $d^s$ depends on $m_2^s$ the following equation must be solved at each time stage:

$$(a^s \cdot \nabla u_{(n+1)}^s) = d_{n+1}^s \quad (E13)$$

$$= \frac{J_{n+1}^s}{J_n^s} - 1$$

$$= \frac{J^s(m_{2(n+1)}^s)}{J^s(m_{2(n)}^s)} - 1$$

Solution of equation (E13) is obtainable directly by evaluating the Jacobian $J^s$ at the current (n+1) and previous (n) time stages ad in equation (E2)

The flow, absorption and deformation processes, described by E1, may be simplified as follows (whereby the Nomenclature for equations (E14) to (E32) is described below):

$$\left. \begin{array}{l} \varepsilon \dfrac{\partial s(\psi)}{\partial t} + \varepsilon s \gamma \dfrac{\partial \psi}{\partial t} - \nabla \cdot [k_r K(\nabla_\psi + e)] = R_\psi(\psi, C, u) \\ \dfrac{\partial C}{\partial t} = R_c(\psi, C, u) \\ \nabla \cdot (au) = d(C) \end{array} \right\} \quad (E14)$$

or in a compact form:

$$L(\phi) = m^T \frac{\partial \phi}{\partial t} + \nabla \cdot (f^c + f^d) - b = 0 \quad (E15)$$

$$\phi = \begin{Bmatrix} \psi \\ C \\ u \end{Bmatrix} \quad m =$$

$$\begin{Bmatrix} \varepsilon\left(\dfrac{\partial s}{\partial \psi} + s\gamma\right) \\ 1 \\ 0 \end{Bmatrix} \quad f^c = \begin{Bmatrix} -k_r K e \\ 0 \\ au \end{Bmatrix} \quad f^d = \begin{Bmatrix} -k_r K \nabla \psi \\ 0 \\ 0 \end{Bmatrix} \quad b = \begin{Bmatrix} R_\psi \\ R_c \\ d \end{Bmatrix}$$

for solving the pressure head of liquid $\psi$, the sorbed liquid concentration $C \equiv m_2^s \overline{C}_{AGMo}^s$ and the solid displacement u. In (2) L($\phi$) is the differential-equation system written in terms of the state variable $\phi(x,t)$. The main nonlinear functional dependence is shown in parentheses. Moreover, dependencies exist for the saturation s, relative permeability $k_r$, saturated conductivity K and porosity $\epsilon$ according to $$s = s(\psi, C)$$

$$k_r = k_r(s) \quad K = K(C) \quad \epsilon = \epsilon(C) \tag{E16}$$

where hysteresis in $s(\psi)$ is implied.

The reaction term $R_\psi$ possesses a sink for mobile liquid due to absorption by the fluid-swellable material. It is a complex relation and implies dependencies on liquid saturation s (accordingly pressure head ($\psi$) with its derivation, porosity $\epsilon$ with its derivation, solid displacement u and sorbed liquid concentration C of the fluid-swellable solid material (e.g. AGM). The reaction $R_c$ possesses a kinetic production term of sorbed (immobile) liquid and is controlled by a reaction constant rate and said sorbed liquid concentration C. Furthermore, $R_c$ incorporates dependencies on liquid saturation s (via the solid-liquid interface area) and the solid displacement u. The solid strain d is a function of the said sorbed liquid concentration C.

The expressions for $R_\psi$, $R_c$ and d can easily determined by the man skilled in the art via comparing (1) and (E 1).

The first equation of (E14) represents a generalized Richards-type flow equation written in a mixed ($\psi$–s)-form where both variables of pressure head $\psi$ and saturation s are employed, which is superior to a standard Richards-type form, where the saturation variable is substituted by the pressure head from beginning.

The pressure head $\psi$ may be chosen as primary variable in the present ($\psi$–s)-formulation, which is capable of simulating both saturated and unsaturated porous media.

The finite element method known in the art is used to discretize the governing equation system E14. The equations are expressed on the physical domain $\Omega^s \subset \Re^D, t \geq t_o$ of porous solid, with the boundary $\Gamma_s$, lying on D-dimensional Euclidean space $\Re^D$, and for time t starting at, and proceeding from some initial time $t_o$. The domain $\Omega^D$ is time-dependent $\Omega^s = \Omega^s(t)$ due to the swelling dynamics. The temporal dependence is considered within a finite interval $(t_n, t_n + \Delta t_n)$, where the subscript n denotes the time level and $\Delta t_n$ is a variable time step length. We define $\Omega_n{}^s = \Omega^s(t_n)$ and $\Omega_{n+1} = \Omega^2(t_n + \Delta t_n)$. The finite element formulation of equations (E14) finally yields the following nonlinear matrix system written in compact form:

$$\begin{aligned} B(C)\dot{S} + O(C)\Psi + K(S, C)\Psi &= F(S, C, U) \quad \text{in } \Omega_{n+1}^s \\ A\dot{C} &= Z(S, C, U) \quad \text{in } \Omega_o^s \\ P\dot{U} + DU &= Q(C) \quad \text{in } \Omega_{n+1}^s \end{aligned} \tag{E17}$$

which has to be solved for $\Psi$, C, and U. Here, $\Psi$, C and U represent the resulting nodal vectors of the liquid pressure head for the deformed (swollen) volume $\Omega_{n+1}{}^2$, the concentration of absorbed liquid per reference (initial, undeformed) bulk volume $\Omega_o{}^s$, and the solid displacement for the deformed volume $\Omega_{n+1}{}^s$, respectively. (Vector S is evaluated with known $\Psi$). The superposed dot indicates differentiation with respect to time t. The main nonlinear functional dependence is shown in parentheses. The second equation in (E17) is based on $\Omega_o{}^s$ as it involves no transport within the domain and its primary variable C is defined with respect to the undeformed geometry. The matrices B, O, A, and P are symmetric. The conductance matrix K is unsymmetrical if a Newton iteration technique is employed for the solution procedure, otherwise it is symmetric. The displacement matrix D is always unsymmetrical. The remaining vectors F, Z and Q represent the RHS terms for liquid sink, kinetic absorption reaction and solid-strain source, respectively.

The third equation of (E17) represents the displacement equation. Due to numerical reasons the hyperbolic equation $\nabla \cdot (au) = d$ must be stabilized. Thus, the displacement equation $\nabla \cdot (au) = d$ is actually solved in a modified (extended) form:

$$\kappa \frac{\partial u}{\partial t} + a \cdot \nabla u - \nabla \cdot (\sigma^o \cdot \nabla u) = d \tag{E18 a and b}$$

with $$\kappa = const \to 0$$

$$\sigma^o = \beta_{upwind}(a \otimes a)$$

and assuming $u\nabla \cdot a \cong 0$ where $\kappa$ is a small artificial compression factor, and $\beta_{upwind}$ denotes the upwind (dampening) parameter, which can be estimated from a characteristic finite element length l as $$\beta_{upwind} \cong l/2 \tag{E18c}$$

Then, the matrix system (4) may be solved in time t by applying a first-order fully implicit predictor-corrector (forward Euler/backward Euler) time stepping scheme with a residual control, as known in the art (Diersch and Perrochet (1999), On the primary variable switching techniques for simulating unsatured-saturated flows, *Adv. Water Resour.* 23 (1999) 271-301) and further described in DHI-WASY GmbH., *Fleflow finite element subsurface flow and transport simulation system*—User's Manual/reference Manual/White papers; Release 5.4; available from DHI-Wasy, Berlin (2008).

It results in the following matrix system $$R_{n+1}^\tau = \tag{E19 a and b and c}$$

$$\frac{B(C_{n+1}^\tau)}{\Delta t_n} S_{n+1} + \left( \frac{O(S_{n+1}^\tau, C_{n+1}^\tau)}{\Delta t_n} + K(S_{n+1}^\tau, C_{n+1}^\tau) \right)$$

$$\Psi_{n+1}^\tau - \frac{B(C_{n+1}^\tau)}{\Delta t_n} S_n - \frac{O(S_{n+1}^\tau, C_{n+1}^\tau)}{\Delta t_n} \Psi_n -$$

$$F(S_{n+1}^\tau, C_{n+1}^\tau, U_n) = 0 \text{ in } \Omega_{n+1}^s$$

$$\frac{A}{\Delta t_n} C_{n+1} = \frac{A}{\Delta t_n} C_n + Z(S_{n+1}^\tau, C_{n+1}^\tau, U_n) \text{ in } \Omega_o^s$$

$$\left( \frac{P}{\Delta t_n} + D \right) U_{n+1} = \frac{P}{\Delta t_n} U_n + Q(C_{n+1}^\tau) \text{ in } \Omega_{n+1}^s$$

where $\tau$ denotes the iteration counter, $R_{n+1}{}^\tau$ is the residual vector of the discretized Richards equation, $\Psi_{n+1}{}^\tau$ and $C_{n+1}{}^\tau$ represent iteration vectors for pressure and concentration to linearize the matrices and vectors. The iterates are started with $\tau = 0$ at the new time level (n+1) by using predictor values $\Psi_{n+1}{}^P$ and $C_{n+1}{}^P$ according to $$\begin{aligned} \Psi_{n+1}^o &= \Psi_{n+1}^P = \Psi_n + \Delta t_n \dot{\Psi}_n \\ C_{n+1}^o &= C_{n+1}^P = C_n + \Delta t_n \dot{C}_n \end{aligned} \tag{E20}$$

where $\dot{\Psi}_n$ and $\dot{C}_n$ are acceleration vectors which have to be recorded during the adaptive time stepping solution process. The predictor values in relation to the corrector values are used to control the new time step according to $$\Delta t_{n+1} = \tag{E21}$$

$$\Delta t_n \min\left[\left(\frac{\delta}{\|d_\Psi^{n+1}\|_{L_2}}\right)^{1/2}, \left(\frac{\delta}{\|d_c^{n+1}\|_{L_2}}\right)^{1/2}, \left(\frac{\delta}{\|d_u^{n+1}\|_{L_2}}\right)^{1/2}\right]$$

with the error vectors for pressure head, concentration and solid displacement (E22)

$$d_\Psi^{n+1} = \frac{1}{2}(\Psi_{n+1} - \Psi_{n+1}^P) \quad d_c^{n+1} = \tag{9}$$

$$\frac{1}{2}(C_{n+1} - C_{n+1}^P) \quad d_u^{n+1} = \frac{1}{2}(U_{n+1} - U_{n+1}^P)$$

where $\|\ldots\|_{L_2}$ are the RMS $L_2$ error norms and $\delta$ is a prescribed temporal error tolerance. This allows an automatic adaptation of the time step size $\Delta t_{n+1}$ in accordance with accuracy requirements.

Optionally, this can be continued by known iteration methods, i.e. Picard or Newton iteration methods, that can be re-applied to the discretized Richards equation (E19a). The matrix system is solved for the primary variable of pressure head and iterated as follows:

$$J(S_{n+1}^\tau, C_{n+1}^\tau)\Delta\Psi_{n+1}^\tau = -R_{n+1}^\tau$$

with the solution increment $$\Delta\Psi_{n+1}^\tau = \Psi_{n+1}^{\tau+1} - \Psi_{n+1}^\tau$$

and the Jacobian with respect to the pressure $$J(S_{n+1}^\tau, C_{n+1}^\tau) = \frac{\partial R_{n+1}^\tau(S_{n+1}^\tau, C_{n+1}^\tau)}{\partial \Psi_{n+1}^\tau} \tag{E23 a, b and c}$$

The Jacobians are given for the Newton method as $$J = \frac{\partial O}{\partial \Psi_{n+1}^\tau}\left(\frac{\Psi_{n+1}^\tau - \Psi_n}{\Delta t_n}\right) + \frac{B}{\Delta t_n}\frac{\partial S_{n+1}^\tau}{\partial \Psi_{n+1}^\tau} + \Psi_{n+1}^\tau \frac{\partial K}{\partial \Psi_{n+1}^\tau} + \frac{O}{\Delta t_n} + K - \frac{\partial F}{\partial \Psi_{n+1}^\tau}$$

and for the Picard method as $$J = \frac{B}{\Delta t_n}\frac{\partial S_{n+1}^\tau}{\partial \Psi_{n+1}^\tau} + \frac{O}{\Delta t_n} + K \tag{E23 d and e}$$

The Jacobian matrices J (10d) and (10e) are unsymmetrical for the Newton method and symmetrical for the Picard method, respectively. The iterations $\tau$ in (10a) may be repeated until a satisfactory convergence is achieved. For example, the iterations are terminated if the residual falls under a user-given error tolerance $\eta$, viz, $$\|R_{n+1}^\tau\|_{L_2} < \eta \tag{E24}$$

where the weighted RMS $L_2$ error norm is used.

The remaining matrix equations for the absorbed concentration and solid displacement are solved by a decoupled sequential iterative approach (SIA), which is combined in an error-controlled adaptive predictor-corrector time stepping technique. Finally, it solves the coupled matrix system for $\Psi, C$ and $U$ at the time level (n+1) as follows:

$$\left.\begin{aligned}&\text{Initialize } \Psi_{n+1}^o = \Psi_{n+1}^P, \; C_{n+1}^o = C_{n+1}^P\\&\text{Solve: } J\Delta\Psi_{n+1}^\tau = -R_{n+1}^\tau \text{ up to } \|R_{n+1}^\tau\|_{L_2} < \eta \quad \text{in } \Omega_{n+1}^s\\&\text{Take: } S_{n+1}^\tau = S_{n+1}^\tau(\Psi_{n+1}^\tau), \; C_{n+1}^\tau = C_{n+1}^\tau(\Psi_{n+1}^\tau)\\&\text{Solve: } \frac{A}{\Delta t_n}C_{n+1} = \frac{A}{\Delta t_n}C_n + Z(S_{n+1}^\tau, C_{n+1}^\tau, U_n) \quad \text{in } \Omega_o^s\\&\text{Solve: } \left(\frac{P}{\Delta t_n}+D\right)U_{n+1} = \frac{P}{\Delta t_n}U_n + Q(C_{n+1}^\tau) \quad \text{in } \Omega_{n+1}^s\end{aligned}\right\} \tag{E25}$$

Mesh movement and refinement as used herein may further be done as follows.

The computed solid displacement $u_{(n+1)i}a_i$ at the node i and at the new time level (n+1) is used together with the stationary displacement direction $a_i$ to move the finite element mesh in an incremental step according to $$\Delta x_{(n+1)i} = u_{(n+1)i}a_i \tag{E26}$$

where $\Delta x_{(n+1)i}$ represents the change in position of node between time t and time $t_{n+1}$. Using this procedure the finite element mesh is updated incrementally in time, as for example shown in FIG. 11. The same procedure may be applicable for quadrilateral elements and 3D meshes, in another embodiment of the invention herein.

Since the swelling of fluid-swellable material herein is typically large (more than ten times of the initial geometry) the element shapes can become unfavorably distorted. This is particularly the case for triangular elements, where skewed and obtuse-angled shapes should be avoided due to numerical reasons.

Thus, an adaptive mesh refinement (AMR) procedure is applied which is controlled via a-posteriori error estimates of the solution by using the error energy norm $$\|E\|^2 = \int_{\Omega'} E^T L(E) d\Omega \tag{E27 a and b}$$

with $$E = \phi - \tilde{\phi}$$

where the exact and the approximate finite element solution is denoted by $\phi$ and $\tilde{\phi}$, respectively. An error criterion is used in the form $$\xi = \frac{\|E\|}{\|\phi\|} \tag{E28}$$

to refine the meshes, where it can be shown that $$\|E\|^2 = -\int_{\Omega'}\left(\nabla(\phi-\tilde{\phi})\cdot(f^d - \tilde{f}^d)\right)d\Omega \tag{E29}$$

$$\|\phi\|^2 = -\int_{\Omega'}(\nabla\phi)\cdot f^d d\Omega$$

To evaluate (16), $\nabla\phi$ is determined by a recovery technique and $\nabla\tilde{\phi}$ by a direct differentiation, as known in the art. By applying equation (E28), finite elements are refined, herein also referred to continuous mesh refinement, according to the accuracy requirements. Alternatively, it is possible to do mesh stretching without refinement when the mesh starts in a pre-compressed shape.

Figure 12:
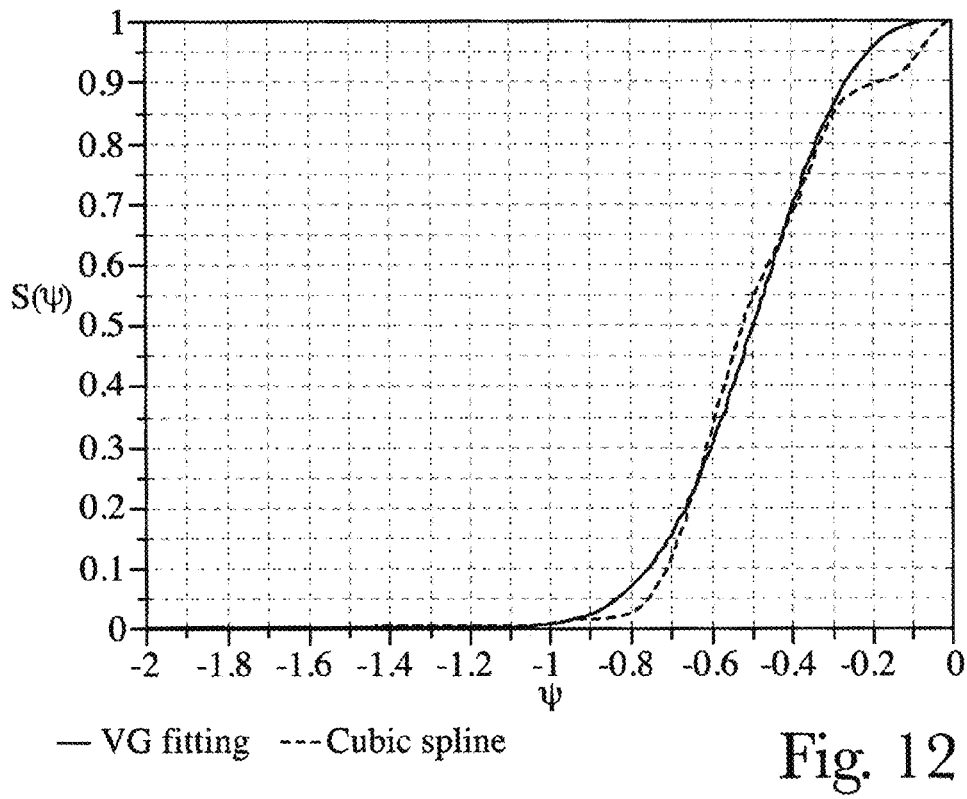
FIG. 12 shows a cubic spline approximation curve versus Van Genuchten analytical function based on real experimental data.

As alternatives to Van Genuchten relation for capillary pressure-saturation relationship and more in general for any material constitutive relationship, it is possible to use splines. Splines are piecewise polynomial continuous functions defined on a given interval and represent a very flexible approach to data approximation (as defined in De Boor, *A practical guide to splines*, Rev. ed. Springer, New York, 2001); classical cubic interpolating splines, may be used herein; these are shown to correspond exactly with the experimental points. FIG. 12 shows an example of a spline approximation curve, which is for the purpose of exemplification compared with a curve obtained by analytical methods (experimental points).

Figure 13A:
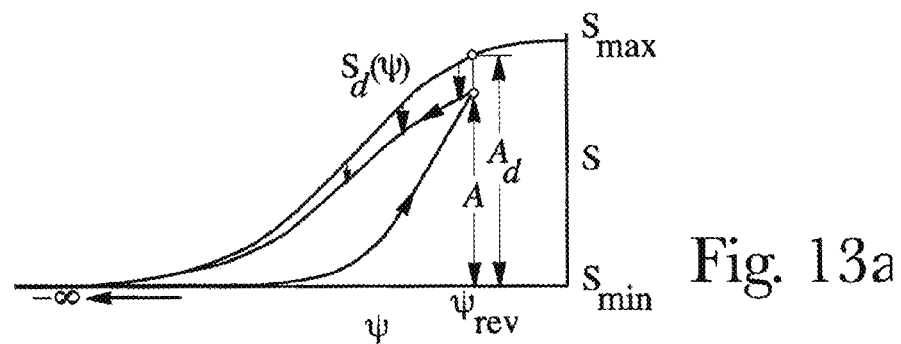
FIG. 13 shows the scanning curve in a hysteresis loop: main drying curve (a) and main wetting curve (b).

The saturation relationship $s(\psi)$ implies a strongly hysteretic behavior, represented by a main drying curve and main wetting curve, as shown in FIGS. 13a) and b).

Empirical representations of $s(\psi)$ (e.g., VG) typically predict an effective saturation $s_e(\psi)$ via an expression involving some parameter vector p, $$\frac{s(\Psi) - s_{min}}{s_{max} - s_{min}} = s_e(\Psi) = f(\Psi, p) \tag{E30}$$

where $s_{min}$ and $s_{max}$ denote the minimum (i.e., residual) and maximum saturation values, respectively, for a given material. If a particular node reverses from wetting to drying, the main drying curve is scaled by changing the maximum saturation value for that curve such that the reversal point falls on the resulting curve. Analogously, if the reversal is in the opposite direction, the main wetting curve is scaled by changing the minimum saturation value. An individual scanning curve is maintained for each node.

When using spline approximations for $s(\psi)$, saturation values are obtained directly from pressure head values and effective saturation is not involved.

Figure 13B:
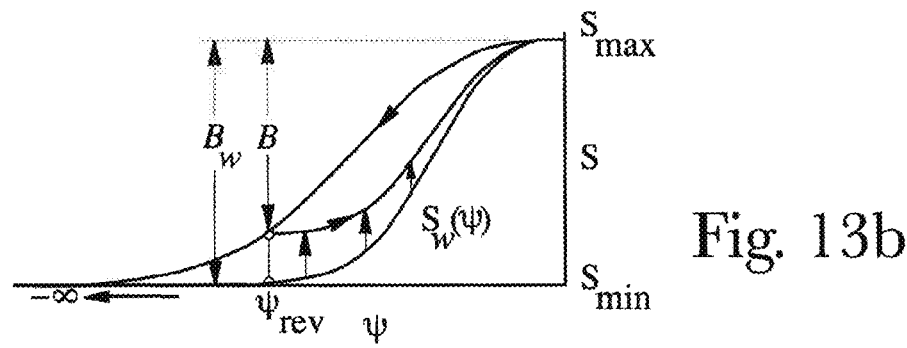

Assuming a maximum saturation $s_{max}$ common to both main curves and assuming an asymptotic minimum saturation $s_{min}$ also common to both main curves, the reversal point $\psi_{rev}$ is used to define a linear scaling according to FIG. 13. The following is the equation for reversal from wetting to drying $$s(\Psi_{rev}) - s_{min} = c_d [s_d(\Psi_{rev}) - s_{min}]$$
$$c_d = \frac{A}{A_d} = \frac{s(\Psi_{rev}) - s_{min}}{s_d(\Psi_{rev}) - s_{min}}$$

and for the reversal from drying to wetting $$s_{max} - s(\Psi_{rev}) = c_w [s_{max} - s_w(\Psi_{rev})] \quad \text{(E31 and E32, respectively)}$$
$$c_w = \frac{B}{B_w} = \frac{s_{max} - s(\Psi_{rev})}{s_{max} - s_w(\Psi_{rev})}$$

where $c_d$ and $c_w$ represent correction factors. The required scanning curves are then defined by:

$$S_d^*(\Psi) = c_d s_d(\Psi) + (1 - c_d) s_{min} \text{ for } \Psi < \Psi_{rev} \text{ for drying;}$$

and:

$$S_w^*(\Psi) = c_w s_w(\Psi) + (1 - c_w) s_{max} \text{ for } \Psi_{rev} < \Psi_{<0} \text{ for wetting.}$$

Nomenclature for Equations (E14) to (E32):

AGM—refers to the fluid-swellable solid material, e.g. including absorbent gelling material, as described herein above.

AF—refers to airfelt material or any other non fluid-swellable component of the fluid-swellable solid material, e.g. glues, polymers, etc.

| | | |
|---|---|---|
| $a_i$ | 1 | direction vector at node i; |
| b | L | height; |
| C | $ML^{-3}$ | intrinsic concentration; |
| $\overline{C}$ | $ML^{-3}$ | bulk concentration; |
| d | | error vector; |
| d | 1 | volumetric solid strain; |
| E | | error vector; |
| e | 1 | gravitational unit vector; |
| f | | generalized flux vector; |
| h | L | = z + $\psi$, hydraulic head of liquid; |
| K | $LT^{-1}$ | hydraulic conductivity tensor; |
| $k_r$ | 1 | relative permeability; |
| $J^s$ | 1 | Jacobian of solid domain, volume dilatation function; |
| L | | partial differential equation operator; |
| l | L | characteristic element length; |
| $m_2^s$ | 1 | AGM x-load; |
| $m_{max}^s$ | 1 | maximum AGM x-load; |
| p | | parameter vector; |
| Q | $T^{-1}$ | volumetric flow rate; |
| R | $L^3 T^{-1}$ | residual vector; |
| R | $ML^{-3} T^{-1}$ | kinetic reaction term; |
| s | 1 | saturation; |
| t | T | time; |
| u | L | scalar solid displacement norm; |
| w | L | width; |
| x | L | spatial coordinate vector; |
| z | L | vertical coordinate; |
| Greek letters | | |
| $\beta_{upwind}$ | L | upwind parameter; |
| $\Gamma$ | $L^2$ | closed boundary; |
| $\gamma$ | $L^{-1}$ | specific liquid compressibility; |
| $\Delta$ | | increment or difference; |
| $\delta$ | 1 | temporal error tolerance; |
| $\epsilon$ | 1 | porosity, void space; |
| $\eta$ | $L^3 T^{-1}$ | residual error tolerance; |
| $\kappa$ | $L^{-1} T$ | artificial compression of solid; |
| $\zeta$ | 1 | mesh refinement error criterion; |
| $\sigma^o$ | L | artificial (dampening) 'diffusive' stress of solid; |
| $\tau$ | $T^{-1}$ | AGM reaction (speed) rate constant; |
| $\phi$ | | state variable vector; |
| $\psi$ | L | pressure head of liquid; |
| $\Omega$ | $L^3$ | domain; |
| $\nabla$ | $L^{-1}$ | Nabla (vector) operator (=grad); |
| d | | drying; |
| e | | effective; |
| $H_2O$ | | water; |
| i | | nodal index; |
| max | | maximum; |
| min | | minimum; |
| n | | time plane; |
| o | | initial; |
| rev | | reversal; |
| w | | wetting; |
| Superscripts | | |
| c | | convective; |
| D | | number of space dimension; |
| d | | diffusive; |
| L | | left; |
| P | | predictor; |
| R | | right; |
| s | | solid phase; |
| T | | transpose; |
| $\tau$ | | iteration counter; |
| Abbreviations | | |
| AGM | | absorbent gelling material; |
| AMR | | adaptive mesh refinement; |

| | |
|---|---|
| IFM | interface manager; |
| RHS | right-hand side; |
| RMS | root-mean square; |
| SIA | sequential iterative approach; |
| VG | van Genuchten; |
| 2D | two dimensions or two-dimensional; |
| 3D | three dimensions or three-dimensional; |
| ( )·( ) | vector dot (scalar) product; |
| ( )⊗( ) | tensor (dyadic) product; |

Figure 2:
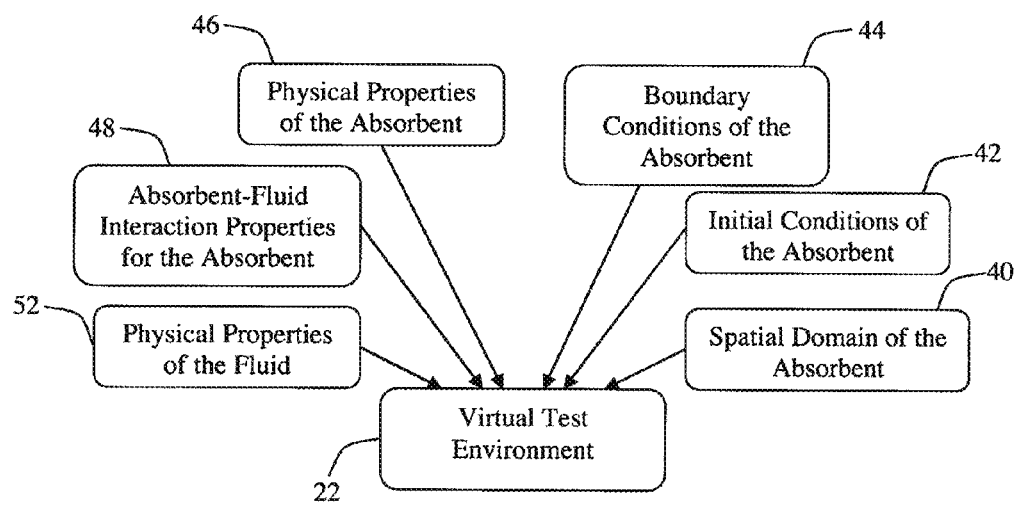
FIG. 2 is a schematic of a virtual test environment.

The method and systems herein are, in addition to solutions the equations and optional equations above, comprised of further virtual test environments. FIG. 2 is a schematic of the components of the virtual test environment 22. The virtual test environment may include the equations herein above The spatial domain of the absorbent (structure or region or layer thereof) 40, is specified and is divided into suitable volume elements, which together form what is commonly referred to as the mesh, further exemplified in FIGS. 10 and 11. Each vertex of a mesh element is called node. The mesh can be coarse or fine, the choice of which requires consideration of the computing time for the virtual test environment 22 and the precision of results. A suitable coarseness or fineness can be determined by trial and error. Such mesh elements can be triangles and quadrilaterals in 2D, while in 3D they can be hexahedra (also known as hexes or hex elements), tetrahedra (tets), square pyramids (pyramids) and extruded triangles (wedges or triangular prisms).

Representative initial conditions of the absorbent core or layer 42 are also specified. The initial conditions of the absorbent 42 can be the same throughout the entire absorbent 40 or vary spatially. Initial saturation can be assumed to be zero, which is representative of an absorbent region or layer free of fluid. Alternatively, the absorbent in the virtual test environment 22 can be assumed to have an initial saturation that is not zero. A non-zero initial saturation can be representative of an absorbent that has absorbed fluid even in ambient conditions. Ambient conditions are the conditions of the absorbent prior to exposure to an insult of fluid. Representative boundary conditions of the absorbent 44 are prescribed for the virtual test environment 22. Boundary conditions can be for instance a given flux or a given constant saturation. An example of a boundary condition may be determined by a standard acquisition test with four 75 ml gushes and 5 minutes between the gushes, or 1 single gush of 10 ml. However any other test protocol can be herein described via properly formulating the boundary conditions.

Representative physical properties of the absorbent 46 are including permeability, capillary pressure, swelling speed, maximum capacity, porosity, fluid-swellable composite material concentration.

Representative absorbent-fluid interaction properties 48 for the absorbent are also specified and include parameters of capillary pressure as function of saturation, relative permeability as function of saturation; they include all the dependencies of permeability, capillary pressure, swelling speed, and porosity on AGM x-load.

Physical properties of the fluid 52 are also specified and include the fluid density, fluid viscosity.

The equations describing the virtual test environment 22 can be solved using direct methods, iterative methods, or any other methods known to those skilled in the art.

Physical properties of the fluid-swellable (composite) material (also referred to as absorbent) in the absorbent article are also specified for the virtual model of an absorbent article. The physical properties of the absorbents in the absorbent article can be obtained from direct measurements of the properties, indirect measurements, inverse modelling, curve-fitting, material property databases, estimation, and/or any other method known to those skilled in the art.

The equations may for example be inputted into commercially available software. One example is to solve the equations herein, e.g. (E1), with general purpose solvers such as Fortran, gPROMS, or with commercial software, as for example Feflow, from Wasy GmbH, Walterdorfer Str. 105, 12526 Berlin Germany. The virtual model may also be performed iteratively by a software program developed in FORTRAN, C++, or similar programming language.

Typically, the solver conditions and convergence criteria are specified. The start time, end time, maximum time-step, and initial time-step are also specified and put into the data set. The gravitational acceleration constant, reference temperature, and reference pressure are also put into the solver data set.

For some virtual test environments, the matrix of equations describing the virtual model may need to be preconditioned so that a solution meeting the specified convergence criteria is obtained. Trial and error can be used to determine if preconditioning is required. As part of the input, convergence criteria and stability parameters are input to control the virtual test environment 22. The convergence criteria and stability parameters can be selected on a trial and error basis. As with most numerical solution approaches, there can be some tradeoff between the criteria selected to control the virtual test environment 22 and the time required for solution and precision of results.

When Feflow is executed, Feflow creates output files as specified by the output controls. The output controls specify which time-steps output files are to be generated and what information is to be reported with each output file. Output from the virtual test environment 22 can comprise fluid saturation as a function of time and position. For each time-step for which output data is generated, the saturation S, amount of liquid in fluid-swellable composite material $m_2$, the capillary pressure for each cell can be reported.

Hence the virtual test environment 22, can be used to generate a virtual spatial map of saturation as a function of location as a function of time.

For absorbent articles, the mesh can be uniform or non-uniform within a single layer structure, e.g. of said fluid-swellabel composite material. A mesh example is shown on FIGS. 10 and 11. For symmetric absorbent articles, only a single section of the absorbent article may need to be virtually modelled. As with most numerical models, the user must weigh and consider the tradeoffs between the amount of computing time required, fineness of the mesh, and precision of results.

Figure 3:
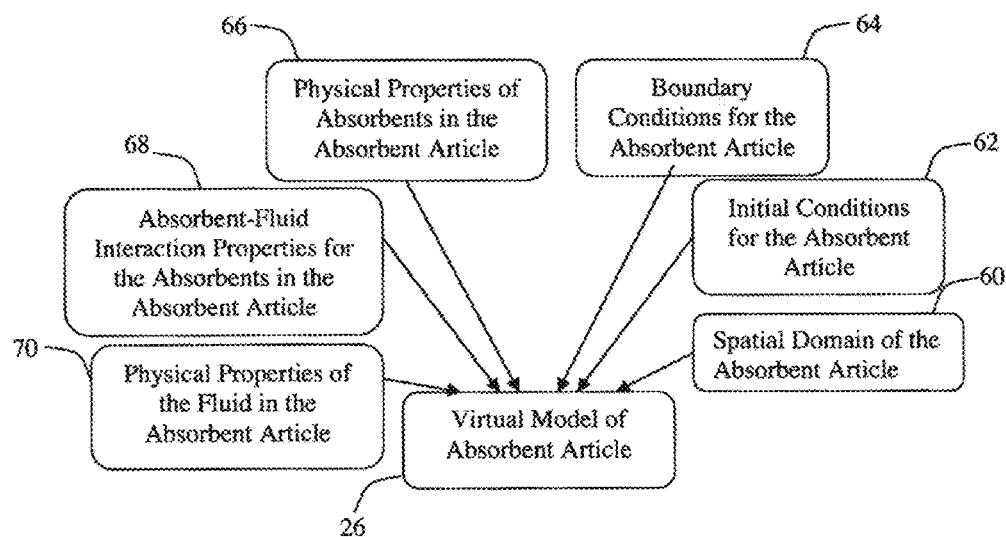
FIG. 3 is a schematic of a further virtual test environment.

FIG. 3 is a block diagram illustrating one example of a computer system 200 for operating the virtual test environment 22 and the virtual model of an absorbent article. The computer system 200 comprises a central processing unit 210, a graphical user interface 220 including a display communicatively coupled to the central processing unit 210, and a user interface selection device 230 communicatively coupled to the central processing unit 210. The user interface selection device 230 can be used to input data and information into the central processing unit 210. The central processing unit 210 can include or has access to memory or data storage units, e.g., hard drive(s), compact disk(s), tape drive(s), and similar memory or data storage units for storing various data and inputs which can be accessed and used in operating the virtual test environment 22 and the virtual model of an absorbent article. Central processing unit 210 can be part of a SUN workstation running a UNIX® operating system, part of a personal computer using INTEL® PC architecture and running a MICROSOFT WINDOWS® operating system, or part of another similarly capable computer architecture and accompanying operating system.

EXAMPLES

Without being bounded to the specific examples shown here, the above described method and system can be used to calculate features correlated with the performance of an absorbent article, or said fluid-swellable composite material herein, that may comprise one or more fluid-swellable solid materials; one or more non-swellable materials; one or more layers; different geometries, including flat and curved and/ or two- or three dimensional geometries, symmetrical or non-symmetrical etc.

For example it is possible to represent a multilayer absorbent structure in a 2D flat geometry representation, such as exemplified in FIG. 6, or 2D curved geometry, as exemplified in FIG. 7, or 3D flat geometry as exemplified in FIG. 8. Not only the swelling behavior can be determined and exemplified in such a manner, but also other features such a level of saturation of the void space(s), for one or more locations of the article or of the fluid-swellable composite material thereof; or for example the absorption/ liquid present in the fluid-swellable solid material of the article; or for example values of capillary pressure, permeability, porosity at a certain location of the article or of the fluid-swellable composite material, at a given time; or to determine the dimensions at a given location, e.g. including thickness, of the absorbent article, or structure or fluid-swellable composite material thereof, at a function of time or at a given time. This can equally be done for multilayer articles, and/or articles that comprise non-fluid-swellable material(s) and/or non-symmetrical articles; different loading points etc.

For example, in one embodiment, the fluid-swellable composite comprises in addition a non-swellable material that has a certain porosity and permeability, and a property of said non-swellable material is inputted into the virtual model herein, e.g. the porosity, permeability and/ or the capillary pressure, and typically the dimensions such a width, length, or surface areas, and thickness (calliper) (as further set out in co pending application U.S. application Ser. No. 11/504,993. Such non-swellable materials may include acquisition materials, surge layers, cellulosic materials, nonwovens, as known in the art in absorbent structures.

Using the method and system herein, it is possible to run a virtual acquisition test in a similar manner to a laboratory experiment, for instance it is possible to compute how long it takes to the absorbent article to absorb a given amount of fluid, applied in a given location of the article or structure, e.g. a gush of 75 ml, both in the case of a single gush or a sequence of gushes, e.g. 4 gushes of 75 ml applied every 5 minutes between the end of one gush and the start of the following gush. For the same examples it is possible to calculate at different locations and times the amount of liquid residual in a given layer, non swelling or swelling, in similar manner to a laboratory experiment. By inputting the material properties measured at a given confining pressure, it is possible to reproduce a certain confining pressure as used in lab acquisition test. Other examples comprise, but are not limited to, the case where the curved geometry is rotated to mimic a certain baby position, as well the inlet location of the fluid can be adjusted to mimic different usage conditions.

Methods (to Determine the Parameters Described Above)

The model herein is useful to predict the performance of the absorbent article or a fluid-swellable composite material thereof, for example in the form of a (layered) structure, while only needing to obtain certain fluid-swellable composite material properties such as:
1. Porosity ($\epsilon$).
2. Fluid-swellable solid material (e.g. AGM) speed rate constant ($\tau$):
3. Maximum fluid-swellable solid material (e.g. AGM) x-load $m_{max}^s$
4. Permeability (k);
5. Capillary pressure ($p_c$):

It is known to the man skilled in the art, that all of the properties above depend on the confining pressure applied onto the sample during the measurement; this can change from 0 up to 1-2 psi, i.e. to mimic a range of very different usage conditions, e.g. the user just walking and exerting only a slight pressure on the article or the user sitting on the article, hence exerting a certain pressure on the article. Therefore the description below should be intended applicable to any pressure.

Porosity ($\epsilon$)

Porosity of the fluid-swellable (composite) material can be obtained from the capillary pressure versus saturation function (or data), computed using mass/volume/density relationships, measured using a column test, determined from image interpretation, or any other method known to those skilled in the art.

By repeating the measurements with liquids with different salt concentration, ranging for instance from 0.5 to 25% of NaCl by weight, porosity data can be determined as function of fluid-swellable composite material load (different salt concentration would induce a different swelling extent). Data of porosity as function of fluid-swellable composite material x-load ($m_2^s$) may then be fitted with any convenient mathematical dependency.

An example is a the correlation below;

$$\varepsilon = \frac{2\varepsilon_{max}}{1 + (m_2^s \varepsilon_{scale} + 1)^{\varepsilon_{exp}}} \tag{E33}$$

In the equation above $\epsilon_{max}$, $\epsilon_{scale}$ and $\epsilon_{exp}$ are fitting parameters, to be determined with fitting methods, known in the art.
AGM speed rate constant ($\tau$) and Maximum AGM x-load $m_{max}^s$
AGM speed rate constant and Maximum AGM x-load are properties dependent on the type of fluid-swellable (composite) material used, the external pressure, temperature, and the liquid type used.

In general $\tau$ is a function of $m_2^s$, but in some embodiments it may be assumed to be constant, such as shown herein. With this assumption, for a fluid-swellable composite material that is totally surrounded with liquid, it is possible to write the equation (being a function time (t)):

$$m_2^s(t) = m_{max}^s \cdot \left(1 - e^{-\tau \cdot t/m_{max}^s}\right) \tag{E34}$$

Therefore, any method able to measure uptake as function of time can be used to generate, the experimental data, which is then to be fitted with equation (E34).

For instance, the method as described below in the "capillary pressure section", can be executed with air pressure equal to atmospheric pressure, where the absorbent material will be fully loaded. The recorded "uptake versus time" data is then used with equation (E34) and (E33), getting the unknown parameters AGM speed rate constant (τ) and Maximum AGM x-load $m_{max}^s$.

Permeability

Permeability for a fluid-swellable (composite) material is in general a function (f) of fluid-swellable composite material x-load ($m_2^s$) and saturation $s_1^e$, $$\text{Permeability} = f(s_1, m_2) = k(m_2^s) \cdot k_r^l(s_1^e, m_2^s) \quad (E35)$$

where
k is the saturated permeability
$k_r^l$ is the relative permeability

In general permeability is a tensor, i.e. the components in the different directions, should be considered, as described in the model equations.

It is described in more detail in the literature on the dependency of the permeability on the swelling extent of the porous media, e.g. Model of Liquid Permeability in Swollen Composites of Superabsorbent Polymer and Fiber, Fredric L. Buchholz Dow Chemical Company, Journal of Applied Polymer Science, Vol. 102, 4075-4084 (2006).

This complex dependency may be handled in a model by assuming that the dependence of permeability on fluid-swellable composite material load $m_2^s$ and saturation $s_1^e$ follows the equations:

$$K = \frac{k \rho_o^l g}{\mu^l} = \quad (E36)$$
$$K_{base} I [1 + k_{coeff} \exp(k_{expcoeff} \hat{m}_2^s) \sin(2\pi k_{sinecoeff} \hat{m}_2^s + k_{sinephase})]$$

$$k_r^l = (s_e^l)^\delta \quad (E37)$$

Hereby, K being the conductivity; k being the permeability, ρ being the density, g being the gravitational acceleration, and μ being the viscosity, I being the unity vector, as described herein and/ or as defined in the first nomenclature list above.

Generally, the saturated permeability k of an absorbent can be directly measured in the laboratory. The in-plane and thru-plane saturated permeability can be measured using any means known to those skilled in the art including, but not limited to, constant hydrostatic pressure head method, and constant volume flow rate method. The saturated absorbent can be subjected to a constant hydrostatic pressure head from a column of fluid about 1 to about 100 cm in height. The column height range may be from about 5 to about 50 cm. The material can be held in place solely by the hydrostatic pressure head of the fluid or with additional confining pressure. The mass flow rate of fluid through the absorbent layer or core is recorded for a set period of time. The mass flow rate is used to calculate the saturated permeability of the absorbent, knowing the area of the absorbent orthogonal to the direction of flow, the thickness of the absorbent in a direction in-plane with the direction of flow, and the change in total pressure head across the absorbent.

k as function of x-load $m_2^s$ can be obtained by modifying any of the methods above as follows. Instead of using the standard liquid, having a standard salt concentration, liquids with different salt concentrations, e.g. ranging for instance from 0.5 to 25% of NaCl by weight, are used (a different salt concentration would induce a different swelling extent) and then permeability at a specific x-load $m_2^s$ can be measured. The specific x-load $m_2^s$ corresponding to a certain salt concentration can be measured as in the porosity method described herein.

In the formula (E37) above, the relative permeability is described through a power model, where the coefficient δ can be estimated based on the literature values or calculated with inverse fitting. A typical value for δ ranges between 3 and 5. Alternatively, other models, such as the van Genuchten-Mualem model for relative permeability, can be used for this scope.

Capillary Pressure (Pc)

Capillary pressure for a fluid swellable (composite) material is herein given as a complex function of fluid-swellable composite material x-load ($m_2^s$) and saturation $s_1^e$.

To handle this complex dependency in a model, it is herein assumed the following equations $$s_e^l = \frac{s^l - s_r^l}{s_s^l - s_r^l} = \begin{cases} \frac{1}{[1 + |\alpha(m_2^s)\Psi^l|^n]^m} & \Psi^l < 0 \\ 1 & \Psi^l \geq 0 \end{cases} \quad (E38)$$

$$\alpha(m_2^s) = \frac{\alpha_{max}}{(1 + m_2^s \alpha_{scale})^{\alpha_{exp}}}, \alpha_{max} = \begin{cases} \alpha_{max,wetting} & \frac{\partial \Psi^l}{\partial t} > 0 \\ \alpha_{max,drying} & \frac{\partial \Psi^l}{\partial t} < 0 \end{cases} \quad (E39)$$

The parameters in equations (E38) and (E39) can be determined from fitting experimental capillary pressure curves, including both uptake and retention curves, obtained at different $m_2^s$; different parameters will be determined for the uptake and retention branches of the hysteresis curves. (The parameters are as specific in the first nomenclature list above).

Various test methods are available to measure and estimate capillary pressure curves of a porous media, e.g. from Absorbent Technology, edited by P. K. Chatterjee and B. S. Gupta, Elsevier, pag 426-436 or Liquid Porosimetry: New Methodology and Applications, Miller and Tyomkin, Journal of Colloid and Interface Science, 162, p 163-170 (1994).

Figure 5:
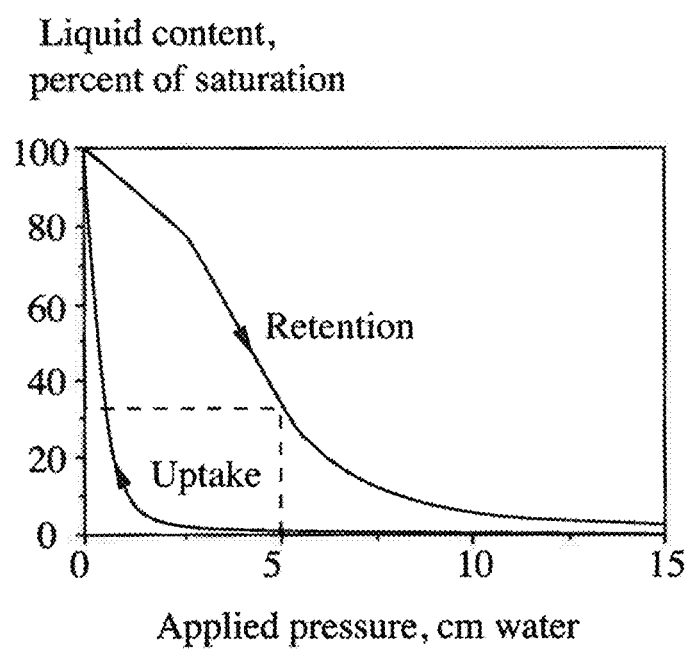
FIG. 5 shows typical capillary pressure curves obtained with the equipment of FIG. 4.

FIG. 5 represents a schematic of a typical method used to measure capillary pressure curves of porous media. The pre-saturated specimen is place on a microporous membrane which is itself supported by a rigid porous plate. (The pre-saturated specimen may be obtained by any method, such as placing a dry sample onto the membrane and decreasing the chamber gas pressure to the atmospheric pressure, and allowing the liquid to enter into all the pores of the material.) The gas pressure within the chamber is increased in steps, causing liquid to flow out of some of the pores, i.e. out of the largest pores first. The amount of liquid removed is monitored by the top-loading recording balance. In this way each level of applied pressure (which determines the largest effective pore size that remains filled) is related to an increment of liquid mass. To induce stepwise drainage from large pores requires very small increases in pressure over a narrow range that is only slightly above atmospheric pressure. For drainage from small pores, the pressure changes must be quite large. Accordingly, the chamber is pressurized by means of a computer controlled, reversible, motor driven piston/cylinder arrangement that can produce the required changes in pressure to cover a pore radius range from 1 to 1000 micron.

It is also possible to measure the uptake curve for a dry sample; in this case the air pressure will be decreased stepwise.

The method above can also be applied to a fluid-swellable (composite) material itself that is pre-swollen to full load (e.g. by leaving the specimen under atmospheric pressure for at least 2 hours in the test liquid), by then increasing the outside air pressure and measuring the retention curve, and then decreasing this again to measure the uptake curve. Alternatively, fluid-swellable composite material can be swollen to different x-load with liquids having different salt concentration, as explained in the permeability section.

Figure 4:
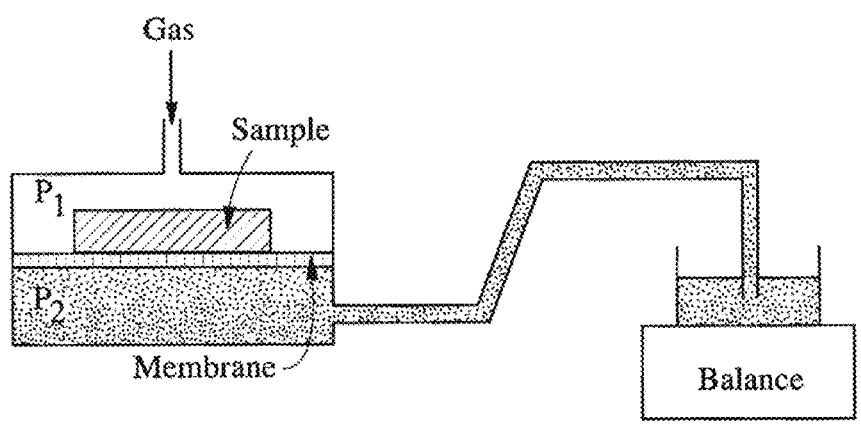
FIG. 4 shows equipment used to determine the capillary pressure, used herein.

FIG. 5 shows typical capillary pressure curves as measured with the method above with the test equipment shown in FIG. 4.

Alternatively, as known in the art, the capillary pressure for a specific liquid of known contact angle and surface tension may be obtained from the measured capillary pressure of a second liquid of known contact angle and surface tension.

Viscosity

Viscosity can be determined with any viscosity method available in the art, e.g. ISO/TR 3666:1998 or DIN 53018-1: 1976.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for analyzing two-dimensional or three-dimensional movement of a fluid in an absorbent article that comprises fluid-swellable composite material, which comprises a fluid-swellable solid material, and that comprises void spaces in the fluid-swellable composite material, the fluid-swellable composite material being defined by a virtual two-dimensional or three-dimensional mesh, to determine performance or property of at least one feature of the absorbent article or the fluid-swellable composite material thereof, the method comprising:
   a) inputting one or more properties for the fluid-swellable composite material, or fluid-swellable solid material thereof, into a virtual model of the absorbent article; and
   b) evaluating, using a computer, the virtual model of the absorbent article to determine performance of the at least one feature of the absorbent article or fluid-swellable composite material thereof;
   the virtual model comprising a solution of the following equations:
   i) an equation for determining a liquid movement in void spaces, at a given location of the fluid-swellable composite material and/or at a given time;
   ii) an equation for determining an amount of liquid present in the fluid-swellable solid material, at a given location of the fluid-swellable composite material and/or at a given time; and
   iii) an equation for determining displacement of one or more locations or the mesh of the fluid-swellable composite material, due to swelling of the material, at a given time, wherein a solution of the equations is described by the following:

$$\varepsilon \frac{\partial_s^l(\Psi^l)}{\partial t} + \varepsilon s^l \overline{\gamma} \frac{\partial \Psi^l}{\partial t} -$$

$$\nabla \cdot [k_r^l K(\nabla \Psi^l + e)] = -\left[\frac{1}{\rho_o^l} \frac{\overline{C}_{AGMo}^s}{J^s} + \varepsilon \frac{\partial_s^l}{\partial m_2^s} + s^l \left(\frac{\partial \varepsilon}{\partial m_2^s} + \frac{\varepsilon}{J^s} \frac{\partial J^s}{\partial m_2^s}\right)\right]$$

$$\frac{\partial m_2^s}{\partial t} - \frac{1}{\rho_o^l} \phi^s(u^s) - \phi^l(u^s)$$

$$\frac{\partial \overline{C}_{L \to So}^s}{\partial t} = \tau a^{sl}(\hat{s}(s_e^l)) \hat{m}_2^s \overline{C}_{AGMo}^s - J^s \phi^s(u^s)$$

$$\nabla \cdot u^s = d^s$$

wherein $s^l$=saturation, t=time, $k^l r$=relative permeability, K=hydraulic conductive tensor, e=elemental, $C^S AGM$=concentration fluid-swellable solid material, $j^s$=jacobian of solid domain, $m^s_2$=AGM x-load, $u^s$=displacement vector, $d^s$=scalar solid strain, $a^{s1}$=saturation-dependent fraction, $C_L$=liquid concentration; and are used to develop an absorbent article.

2. The method of claim 1, wherein in step a) properties of the fluid-swellable composite material, or fluid-swellable solid material thereof, inputted into the virtual model are selected from Porosity, Swelling Speed, Maximum Capacity, Capillary Pressure, Permeability and/or Concentration of the fluid-swellable solid material.

3. The method of claim 1, wherein the liquid-swellable composite material comprises one or more non-swellable materials.

4. The method of claim 1, wherein the absorbent article comprises two or more distinct layers of the fluid-swellable composite material or of the fluid-swellable solid material thereof, the layers being at least partially separated by or in combination with one or more solid, liquid-permeable, non-fluid-swellable materials.

5. The method of claim 1, wherein the virtual model relates to swelling of the fluid-swellable composite material in three dimensions.

6. The method of claim 1, wherein the fluid-swellable composite comprises in addition a non-swellable material, and whereby the step a) includes in addition inputting a property of the non-swellable material.

7. The method of claim 1, wherein the virtual model is formulated using Finite Element subsurface Flow System.

8. The method of claim 1, wherein the fluid is selected from the group consisting of water, artificial menstrual fluid, blood, menstrual blood, human and animal menstrual fluid, synthetic vaginal discharge, human and animal vaginal discharge, synthetic urine, urine, fluid from a bowel movement, bowel movement analog, sweat, synthetic sweat, a skin care product, a lubricant, a surfactant, a cleanser, a detergent, a beverage, a petroleum product, and mixtures thereof.

9. The method of claim 1, wherein the absorbent article is selected from the group consisting of diapers, training-pants, adult incontinence product, feminine hygiene products, sani- 10. A method for analyzing two-dimensional or three-dimensional movement of a fluid in an absorbent article that comprises fluid-swellable composite material, which comprises a fluid-swellable solid material, and that comprises void spaces in the fluid-swellable composite material, the fluid-swellable composite material being defined by a virtual two-dimensional or three-dimensional mesh, to determine performance of at least one feature of the absorbent article or the fluid-swellable composite material thereof, the method comprising:
   a) inputting one or more properties for the fluid-swellable composite material, or fluid-swellable solid material thereof, into a virtual model of the absorbent article; and
   b) evaluating, using a computer, the virtual model of the absorbent article to determine performance of the at least one feature of the absorbent article, the virtual model comprising solutions of the following equations:

$$\varepsilon \frac{\partial_s^l(\Psi^l)}{\partial t} + \varepsilon s^l \overline{\gamma} \frac{\partial \Psi^l}{\partial t} -$$

$$\nabla \cdot [k_r^l K(\nabla \Psi^l + e)] = -\left[\frac{1}{\rho_o^l} \frac{\overline{C}_{AGMo}^s}{J^s} + \varepsilon \frac{\partial_s^l}{\partial m_2^s} + s^l \left(\frac{\partial \varepsilon}{\partial m_2^s} + \frac{\varepsilon}{J^s} \frac{\partial J^s}{\partial m_2^s}\right)\right]$$

$$\frac{\partial m_2^s}{\partial t} - \frac{1}{\rho_o^l} \phi^s(u^s) - \phi^l(u^s)$$

$$\frac{\partial \overline{C}_{L \to So}^s}{\partial t} = \tau a^{sl}(\hat{s}(s_e^l)) \hat{m}_2^s \overline{C}_{AGMo}^s - J^s \phi^s(u^s)$$

$$\nabla \cdot u^s = d^s$$

wherein $s^1$=saturation, t=time, $k^1 r$=relative permeability, K=hydraulic conductive tensor, e=elemental, $C^S AGM$=concentration fluid-swellable solid material, $J^s$=jacobian of solid domain, $m^s{}_2$=AGM x-load, $u^s$=displacement vector, $d^s$=scalar solid strain, $a^{s1}$=saturation-dependent fraction, $C_L$=liquid concentration; and are used to develop an absorbent article.

11. The method of claim 10, wherein in step a) properties of the fluid-swellable composite material, or fluid-swellable solid material thereof, inputted into the virtual model are selected from Porosity, Swelling Speed, Maximum Capacity, Capillary Pressure, Permeability and/or Concentration of the fluid-swellable solid material.

12. The method of claim 10, wherein the liquid-swellable composite material comprises one or more non-swellable materials.

13. The method of claim 10, wherein the absorbent article comprises two or more distinct layers of the fluid-swellable composite material or of the fluid-swellable solid material thereof, the layers being at least partially separated by or in combination with one or more solid, liquid-permeable, non-fluid-swellable materials.

14. The method of claim 10, wherein the virtual model relates to swelling of the fluid-swellable composite material in three dimensions.

15. The method of claim 10, wherein the fluid-swellable composite comprises in addition a non-swellable material, and whereby the step a) includes in addition inputting a property of the non-swellable material.

16. The method of claim 10, wherein the virtual model is formulated using Finite Element subsurface Flow System.

17. The method of claim 10, wherein the fluid is selected from the group consisting of water, artificial menstrual fluid, blood, menstrual blood, human and animal menstrual fluid, synthetic vaginal discharge, human and animal vaginal discharge, synthetic urine, urine, fluid from a bowel movement, bowel movement analog, sweat, synthetic sweat, a skin care product, a lubricant, a surfactant, a cleanser, a detergent, a beverage, a petroleum product, and mixtures thereof.

18. The method of claim 10, wherein the absorbent article is selected from the group consisting of diapers, training-pants, adult incontinence product, feminine hygiene products, sanitary napkins, pads or towels, wipes, breast pads, paper towels, toilet paper, wound dressings, handkerchiefs.

* * * * *